United States Patent
Ashline

(10) Patent No.: US 8,375,472 B2
(45) Date of Patent: Feb. 19, 2013

(54) MULTI-POINT TETHERING SYSTEM FOR HEAD AND NECK RESTRAINT DEVICES

(75) Inventor: Trevor P. Ashline, Mooresville, NC (US)

(73) Assignee: Simpson Performance Products, Inc., Mooresville, NC (US)

( * ) Notice: Subject to any disclaimer, the term of this patent is extended or adjusted under 35 U.S.C. 154(b) by 0 days.

(21) Appl. No.: 12/082,966

(22) Filed: Apr. 14, 2008

(65) Prior Publication Data

US 2008/0256684 A1 Oct. 23, 2008

Related U.S. Application Data

(63) Continuation-in-part of application No. 11/787,532, filed on Apr. 13, 2007, now Pat. No. 8,272,074, and a continuation-in-part of application No. 11/131,782, filed on May 17, 2005, now Pat. No. 7,765,623, which is a continuation-in-part of application No. 10/728,003, filed on Dec. 3, 2003, now Pat. No. 6,931,669, which is a continuation-in-part of application No. 10/660,230, filed on Sep. 9, 2003, now abandoned, and a continuation-in-part of application No. 10/335,341, filed on Dec. 31, 2002, now Pat. No. 6,871,360, which is a continuation-in-part of application No. 29/161,634, filed on May 31, 2002, now Pat. No. Des. 522,178, said application No. 10/728,003 is a continuation-in-part of application No. 09/993,839, filed on Nov. 16, 2001, now Pat. No. 6,499,149, which is a continuation-in-part of application No. 09/837,215, filed on Apr. 19, 2001, now abandoned.

(60) Provisional application No. 60/923,888, filed on Apr. 13, 2007, provisional application No. 60/797,921, filed on May 5, 2006, provisional application No. 60/409,085, filed on Sep. 9, 2002.

(51) Int. Cl.
*A42B 7/00* (2006.01)

(52) U.S. Cl. ............................................... 2/421; 2/425

(58) Field of Classification Search .................. 2/2, 410, 2/421, 422, 425; 280/290
See application file for complete search history.

(56) References Cited

U.S. PATENT DOCUMENTS

| | | | | |
|---|---|---|---|---|
| 3,148,375 A * | 9/1964 | Jones | | 2/421 |
| 3,671,974 A * | 6/1972 | Sims | | 2/421 |
| 3,925,822 A * | 12/1975 | Sawyer | | 2/421 |
| 4,319,362 A * | 3/1982 | Ettinger | | 2/415 |
| 4,638,510 A * | 1/1987 | Hubbard | | 2/6.1 |
| 4,664,341 A * | 5/1987 | Cummings | | 244/122 AG |
| 5,272,770 A * | 12/1993 | Allen et al. | | 2/421 |
| 5,517,699 A * | 5/1996 | Abraham, II | | 2/425 |
| 6,330,722 B1 * | 12/2001 | Betts | | 2/416 |
| 6,381,758 B1 * | 5/2002 | Roberts et al. | | 2/421 |
| 6,591,430 B1 * | 7/2003 | Sledge | | 2/468 |
| 6,729,643 B1 * | 5/2004 | Bassick et al. | | 280/730.1 |
| 6,751,809 B1 * | 6/2004 | Cooper et al. | | 2/421 |
| 6,810,535 B1 * | 11/2004 | Moloney | | 2/411 |
| 6,813,782 B2 * | 11/2004 | Kintzi et al. | | 2/421 |
| 7,155,747 B2 * | 1/2007 | Baker | | 2/422 |
| 7,380,290 B2 * | 6/2008 | Mothaffar | | 2/421 |
| 7,395,558 B2 * | 7/2008 | Mothaffar | | 2/421 |

* cited by examiner

*Primary Examiner* — Danny Worrell
(74) *Attorney, Agent, or Firm* — Everman Law Firm, PA; Gregory R. Everman

(57) ABSTRACT

A system of tethers for controlling a driver's head during operation of a vehicle, comprising: at least two frontal straps having first ends attached to a helmet and second ends attached to shoulder straps, torso strap and/or vehicle's seat belt; at least two rear straps having first ends attached to a helmet and second ends attached to shoulder straps or the support member; and wherein the frontal and rear straps are taut during normal operation.

20 Claims, 22 Drawing Sheets

MULTI-POINT TETHERING SYSTEM FOR HEAD AND NECK RESTRAINT DEVICES

CROSS REFERENCE TO RELATED APPLICATIONS

This application claims the benefit of U.S. Provisional Application No. 60/923,888, filed Apr. 13, 2007. This application also is a continuation-in-part of application Ser. No. 11/787,532, filed Apr. 13, 2007, now U.S. Pat. No. 8,272,074, which claims the benefit of U.S. Provisional Application No. 60/797,921, filed May 5, 2006, and which is a continuation-in-part of application Ser. No. 11/131,782, filed May 17, 2005 now U.S. Pat. No. 7,765,623, which is a continuation-in-part of application Ser. No. 10/728,003, filed Dec. 3, 2003, U.S. Pat. No. 6,931,669, which is a continuation-in-part of application Ser. No. 10/660,230, filed Sep. 9, 2003, abandoned, which claims the benefit of U.S. Provisional Application No. 60/409,085, filed Sep. 9, 2002. application Ser. No. 10/728,003 is also a continuation-in-part of application Ser. No. 10/335,341, filed Dec. 31, 2002, U.S. Pat. No. 6,871,360, which is a continuation-in-part of application Ser. No. 29/161,634, filed May 31, 2002, Patent No. D522,178, and a continuation-in-part of application Ser. No. 09/993,839, filed Nov. 16, 2001, U.S. Pat. No. 6,499,149, which is a continuation-in-part of application Ser. No. 09/837,215, filed Apr. 19, 2001, abandoned.

BACKGROUND OF THE INVENTION

1. Filed of the Invention

The present invention relates to the field of safety devices worn by a driver when operating a high-performance vehicle. More specifically, the present invention relates to a restraint device that controls movement of, and reduces forces applied to, a driver's head, neck and spine when the driver is subjected to high acceleration and vibration forces, such as those forces that may occur during a drag race, and also when the driver is subjected to deceleration forces that occur during a collision event.

2. Description of the Related Art

Traditionally, drivers of high-performance vehicles have employed standard five or six point seat belt assemblies, in which all of the belts tie into a common buckle, to restrain the driver during racing. Although standard seat belt assemblies are effective in constraining the torso of the driver to the seat assembly during a collision event, they do not restrain the driver's head or neck. As such, the driver's head may move forward, rearward, sideways or oscillate side-to-side depending of the forces being applied to the driver.

In recent years, head and neck restraint devices have become widely used in various racing venues such as NASCAR®, formula and stock to control forward and downward motion of a driver's head, and to reduce tension loading in a driver's neck, in the event of a collision. Well-known devices for this purpose include Hutchens Device®, R-3™, Hutchens II™, Hutchens Hybrid™ and Hans Device®.

With regards to drag racing, due to the exceptional amount of g-forces during take-off (i.e. launch), a single strap has been used to restrain the driver's head from snapping backwards during initial acceleration (launch) of the vehicle. The strap is a single point attachment, meaning that it is attached at one end to the center-line of the helmet's chin bar and at the other end to the vehicle's seat belt assembly, i.e. the seat belt buckle. This strap provides assistance to the driver during launch, but has little utility in frontal, angular frontal and side impacts, or during vibration of the vehicle.

During a drag race, high acceleration and speeds cause the tires to go out-of-round, resulting in vibration of the vehicle. Since the single point attachment strap acts like a pendulum, providing little resistance to this side-to-side movement, this vibration has been known to cause severe side-to-side oscillation of the driver's head which can lead to loss of control of the vehicle or cause injury or even death by banging the driver's head against the interior of the vehicle.

Accordingly, there is a need in the art of continued improvement of head and neck restraint devices and tethering systems to protect drivers during a collision event regardless of the direction if impact and to improve the driver's safety in a greater variety of racing venues and operating conditions.

BRIEF SUMMARY OF THE INVENTION

To achieve the foregoing and other objects, the present invention, as embodied and broadly described herein, provides various embodiments of a multi-point tethering system for head and neck restraint devices for the purpose of controlling the head and neck of a driver while operating a high performance vehicle.

BRIEF DESCRIPTION OF THE DRAWINGS

The above described and other features, aspects, and advantages of the present invention are better understood when the following detailed description of the invention is read with reference to the accompanying drawings, wherein.

DESCRIPTION OF THE PREFERRED EMBODIMENTS

Figure 1:
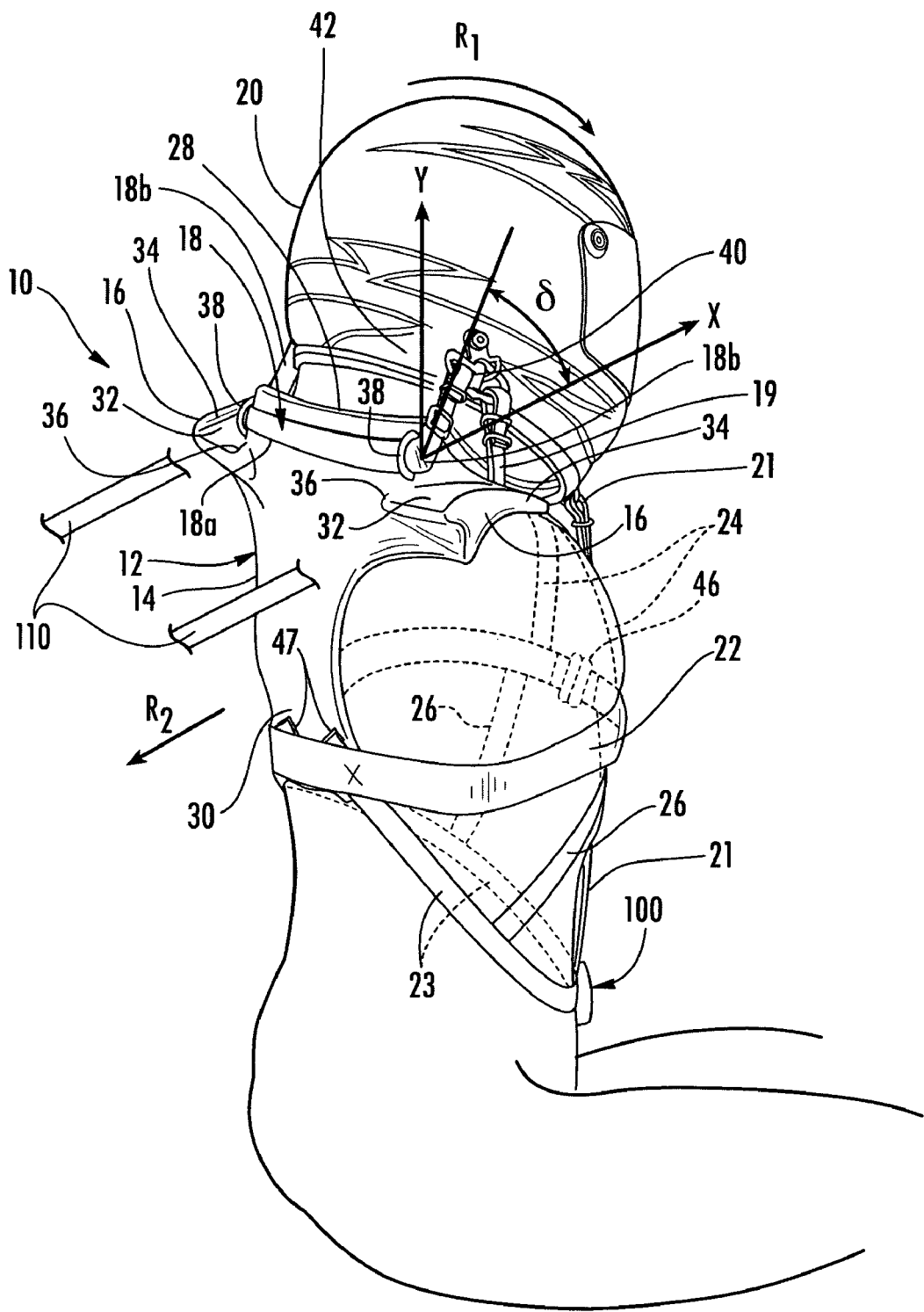
FIG. 1 is a perspective view of an embodiment of a multi-point tethering system in use with a head and neck restraint device. The restraint device includes a support member having back and shoulder portions respectively located along the back and at least partially over the shoulders of the driver and anchor straps extending forward over the waist for attaching the support member to a vehicle's seat belt assembly (seat belt assembly is partially shown). The tethering system provides rear, side and front tethers that attach the driver's helmet to the restraint device and wherein the front tethers are also attached to the vehicle's seat belt assembly.

The present invention will now be described more fully hereinafter with reference to the accompanying drawings in which preferred embodiments of the invention are shown. This invention may, however, be embodied in many different forms and should not be considered as limited to the embodiments set forth herein. These exemplary embodiments are provided so that this disclosure will be both thorough and complete, and will fully convey the scope of the invention to those skilled in the art.

The term "driver" as used throughout this specification is to be construed as being inclusive of any person that is an occupant of a vehicle, whether a driver or passenger. The term "vehicle" is to be broadly construed and includes without limitation racing vehicles, automobiles, boats, motorcycles, go-carts, off-road vehicles, ATVs and aircraft. Various embodiments the present invention have utility with a great variety of racing venues, for example NASCAR®, Busch Series, cup, formula, stock, dirt, desert, monster truck, and have particular utility in the field of drag racing such as funny car and top fuel racing.

The present invention is a system of tethers (rear, side and front tethers) which attach a helmet to a head and neck restraint device and/or seat belt assembly for the purpose of controlling the head and neck of a driver while operating a high performance vehicle. In various embodiments, the restraint device includes support member having a back portion, a support member having a yoke, or a system of straps which do not require a support member. In various embodiments, the restraint device may be anchored by at least one strap to the vehicle's seat belt assembly and/or the driver's body (e.g. the driver's legs and/or torso). As used herein, the term "anchor" includes a driver's body, such as the driver's legs (the term "legs" includes the driver's waist, hips and legs) and torso (the term "torso" includes the driver's waist and torso), and/or a component of a vehicle such as the vehicle's seat belt assembly. The various embodiments are described herein in greater detail below.

The term "helmet", as used herein, includes any article wearable on a driver's head. For example, and not to be construed as being limiting, "helmet" includes conventional head protective devices, such as racing helmets having a hard exterior shell for protecting a driver's head against impact, and also articles that do not have a hardened exterior shell, such as a skullcap, an example of which is sold by Speedway Safety Equipment of Hueytown, Alabama.

The term "tether", as used herein, includes, without limitation, any tether, webbing, strap, dashpot/dashpot containing a controllable rheological fluid such as that disclosed in U.S. Pat. No. 7,155,747 to Gregg S. Baker, belt, cord, chain, cable, rope, band, or the like, that is adapted to attach a restraint device to a helmet. Tether also includes the hardware and components (e.g. rings, loops and clips) thereon that allow the tether to be attached to a helmet, restraint device or seat belt assembly. Moreover, the term tether includes, without limitation, where the tether has one end attached to a helmet and the other end attached to the restraint device or seat belt assembly (an example of which is side tether 48 of FIG. 1); where the tether is one continuous length having terminal ends available for attaching to a helmet and an intermediate section attached to an embodiment of the restraint device (an example of which is rear tether 18 of FIG. 1); a network of webbing (not illustrated) that wraps over a helmet and which attaches to an embodiment of the restraint device; a tether that attaches a skull cap (not illustrated) to an embodiment of the restraint device; and the other suitable arrangements. It is to be understood that each tether may be comprised of more than one section and that the term tether may include only the tether section that attaches to the support member and/or the entire tethering system that joins the support member to the helmet.

In the various embodiments, the tether is attached to the restraint device or seat belt assembly and is capable of being, for being, adapted to be attached to a helmet. The terms "attached" (and its various forms: "attaching", "attachable", "attaches" and "attach") as used herein, includes without limitation affixed, coupled, secured, fastened, joined and connected. Attached also include when components are slidably coupled together without being affixed at a specific location, for example if the tether 18 of FIG. 1 was allowed to slide relative to the mechanical clips 38. A non-exhaustive list of articles, means and/or methods for attaching includes mechanical fasteners, clips, straps, rings, adhesive, bonding, hooks, weaving, weaving through a slot in the support member, tying, stitching and encircling, for example. The term attached does not include where an article is engaged against another article without being coupled together. For example, in FIG. 1 the vehicle's shoulder belts 110 are illustrated as being positioned on and engaged against shoulder portions 16 of the support member 14 but without being attached together.

Regarding the embodiments illustrated by FIGS. 1-13 and 16-20, at least one strap is provided for attaching the restraint device to an anchor (i.e. the driver's body and/or seat belt assembly) for controlling a driver's head and neck during launch or in the event of a collision. The term "strap", as used herein, includes without limitation a strap, webbing, belt, cord, chain, cable, rope, band, or the like. It is to be understood that in the embodiments described herein, a singularly illustrated or described strap may be replaced by a plurality of straps, and that any strap may be comprised of a plurality of sections.

Not to be construed as limiting, a preferred construction of the straps and tethers described herein are of polyester webbing, having suitable strength and performance characteristics necessary for operating under the load conditions associated with high-performance vehicle racing. Moreover, each strap and tether may be provided with adjustment means, such as for example a webbing slide adjuster, a 3-bar ring, or other article, for adjusting the length of the strap or tether in order to fit and seat the tethering system and restraint device properly to a driver.

Regarding the embodiments illustrated by FIGS. 1-13 and 16-20, the tethering system in combination with the restraint device is light-weight, non-bulky and easily carried on a driver, such that the invented device does not significantly inhibit driver ingress and egress from a vehicle. Furthermore, the present invention allows for the driver to be released from being secured to the vehicle by merely unlatching the vehicle's seat belt assembly.

Figure 2:
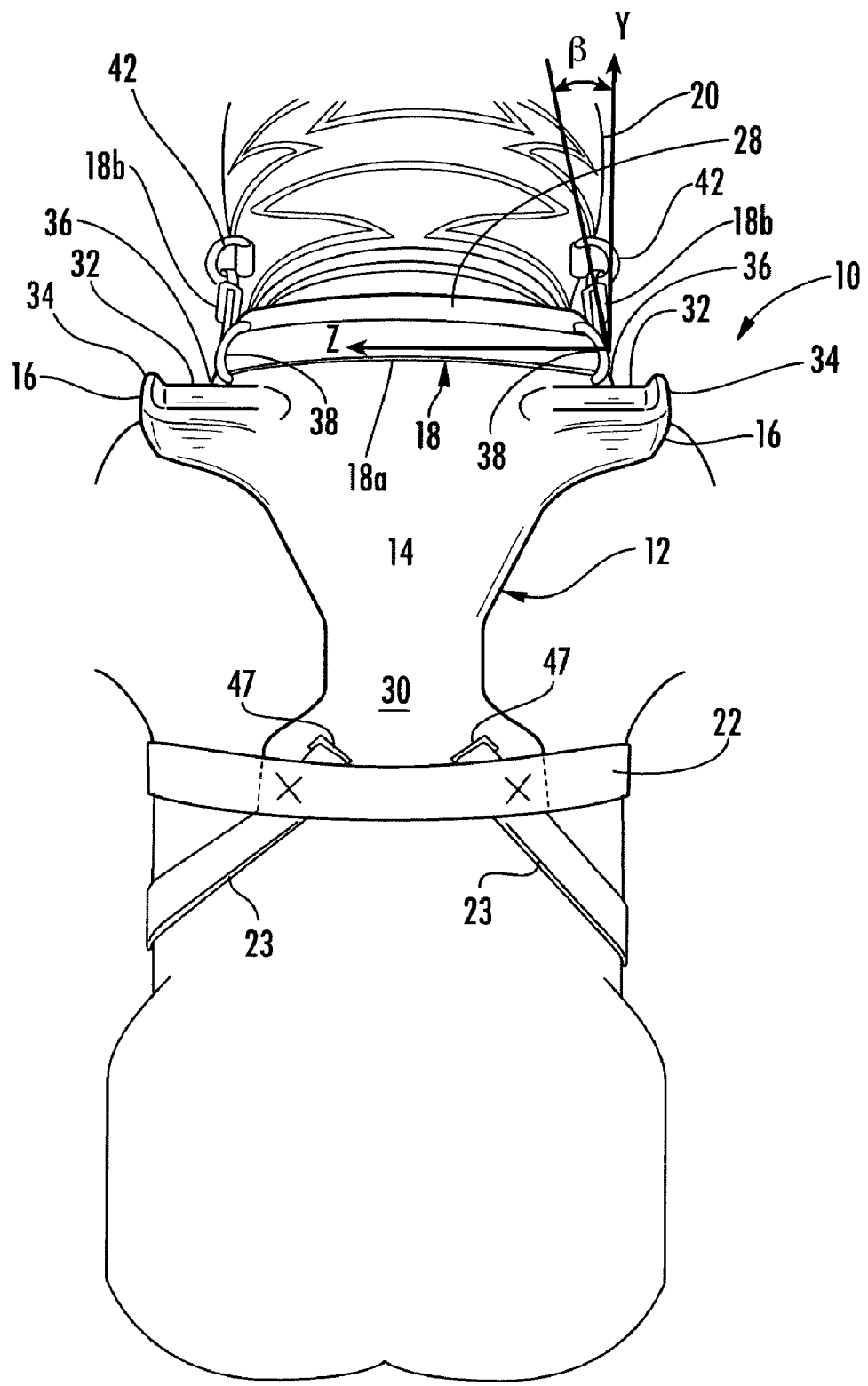
FIG. 2 is a rear view of the tethering system of FIG. 1.

Referring to the drawings, and particularly FIGS. 1 and 2, the illustrated restraint device 10 is an example of one of many different head and neck restraint devices with which the invented tethering system may be used. The restraint device 10 includes a support member 12 having a back portion 14 positionable along a driver's back and shoulder portions 16 positionable over the driver's shoulders; at least one strap for attaching the device 10 to at least one anchor (e.g. torso anchor strap 22 attaches the device 10 to the driver's torso, and seat belt anchor strap 23 attaches the device 10 to the seat belt assembly 100; and shoulder straps 24 which assist in holding the device 10 in place on the driver. The tethering system includes at least one tether (rear, side and front tethers 18, 19, 21 are illustrated) for attaching a helmet 20 to the restraint device 10 and/or a seat belt assembly 100. Other straps may be included, such as connector straps 26 which attach the torso anchor strap 22 to the seat belt anchor strap 23 and assist in maintaining positioning of the seat belt anchor strap 23 for attachment to the seat belt assembly 100 as the driver enters the vehicle.

Referring to FIGS. 1 and 2, the support member 12 is configured to be worn on the driver and positions the various straps (e.g. 22, 23 and 24) and tethers 18, 19, 21 in relation to the driver. The support member 12, in conjunction with the various straps and anchor(s), control the head and neck of the driver during a collision event and offset a portion of the associated forces. In one aspect, the support member 12 provides a rigid structure through which forces are ultimately transferred to the anchor. In another aspect, the support member 12 functions in a cam-like manner to decrease delay and improve responsiveness in opposing deceleration forces. That is, as the driver's head rotates forward and downward (as illustrated by arrow R1) the lower portion of the support member 12 is caused to rotate rearward (as illustrated by arrow R2) whereby the seat belt anchor strap 23 and torso anchor strap 22 go into tension to oppose the deceleration forces.

The length of the support member 12 may vary according to the type of vehicle, racing venue and driver preference. That is, the support member 12 may have a first section 28 that terminates above the driver's head and a second section 30 that terminates below the driver's gluteus maximus, or have a length there-between. In the preferred embodiment, the first section 28 terminates at the back of the driver's neck, below the driver's helmet 20, so that the helmet 20 engages the vehicle's seat assembly headrest and not the support member 12. This preferred upper height limit to the support member 12 advantageously allows for the driver's helmet 20 to engage against the seat assembly headrest upon rebounding during a collision event and makes it easier to egress the vehicle since there is less exposed material to catch on the window frame. Regarding, the second section 30, it preferably terminates near the bottom of the driver's shoulder blades. As such, the preferred total length of the support member 12 is between eight and twelve inches.

As with the length, the support member 12 may also be configured with different widths. Although not to be construed as limiting, preferably the width of the back portion 14 (i.e. not including the shoulder portions 16) of the support member 12 is between two and twelve inches. More preferably, the width of the first section 28 is between five and twelve inches and the width of the second section 30 is between three and eight inches. In an exemplary embodiment, the first section 28 has a width of about eight inches in order to provide suitable placement and angle of the tether 14 to the helmet 20, and the second section 30 is about 3 ½ inches in width in order to be positioned between the driver's shoulder blades for comfort purposes. Preferably, the second section 30 has an enlarged terminal end to facilitate positioning and attachment of the anchor straps 22, 23. Additionally, the inner and outer surfaces of the support member 12 may be planar or, more preferably, contoured in order to accommodate the driver's back and seat assembly, respectively, and to provide desired strength characteristics.

Figure 3:
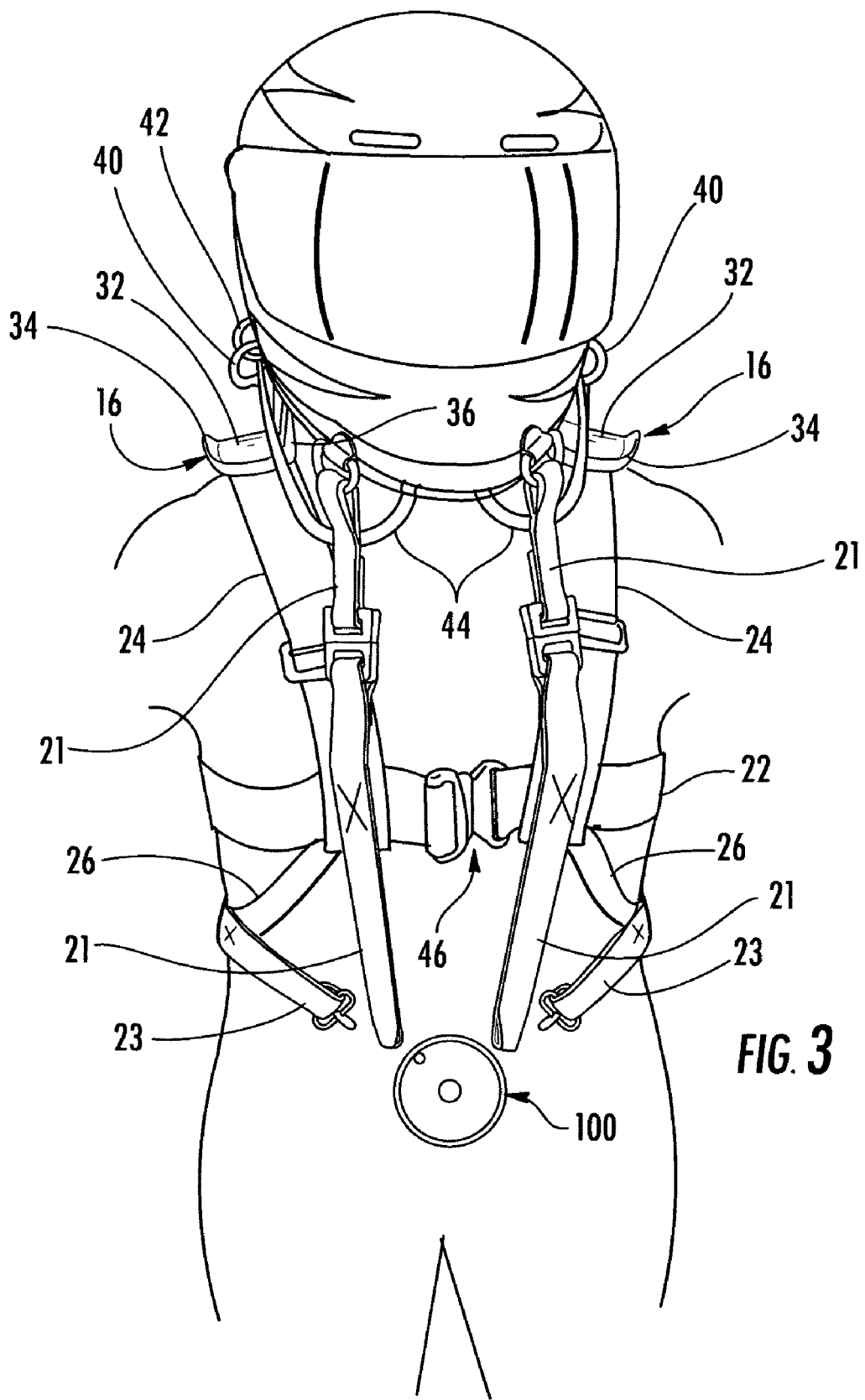
FIG. 3 is a front view of the tethering system of FIG. 1.

Referring to FIGS. 1-3, the shoulder portions 16 extend laterally from, and also forward of, the back portion 14 for being positioned over the shoulders of the driver. The top surface of the shoulder portions 16 have a channel 32 defined between an outer lip 34 and an inner lip 36 partially formed by the first section 28 of the back portion 14. Referring to FIG. 1, the channel 32 is sized to accommodate shoulder belts 110 of the vehicle seat belt assembly and provides an engagement surface against which the shoulder belts 110 react during a collision event. In the preferred embodiment, the channel 32 is slightly curved to more evenly distribute loads that occur when the shoulder belts 110 react there-against. It is to be understood that the shoulder portions 16 may have various configurations including extending: rearward of the back portion 14, over the shoulder, forward of the shoulder and/or over the shoulder and downward over the upper torso of the driver. However, in balancing performance, comfort and practical concerns such as modification to the seat assembly, it is preferred that the shoulder portions 16 do not extend rearward of the back portion 14 or, if so, only by a modest amount so that modification to the seat assembly is not required. Additionally, the shoulder portions 16 preferably terminate prior to the driver's clavicle, whereby it does not extend on or over the clavicle. More preferably, the shoulder portions 16 are positioned on top of the trapezius muscles while terminating prior to the clavicle.

The support member 12 is rigid and has sufficient strength in order to maintain structural integrity while resisting force loads. It is to be understood the term rigid means principally rigid and is inclusive of a minor amount of flexibility as the support member 12 may exhibit some resiliency due to significant loads being placed thereon. Notwithstanding, it is preferred that the support member 12 has minimal or no elasticity in order to better control the driver's head and neck.

The support member 12 is preferably constructed of a light-weight, high-strength material having sufficient rigidity, such as plastic or more preferably carbon fiber. A nonexhaustive list of other materials that may yield a high-strength, rigid construction includes metal, composites and fiberglass. The inner surface of the support member 12 may be provided with a cushion, padding, gel pad, fabric, or the like, in order to comfort the driver from the rigid support member 12.

The invented tethering system includes front, side and rear tethers 21, 19, 18 to control movement of the driver's head. The front tethers 21 are particularly useful in countering launch and vibration forces that commonly occur during drag racing.

The front tethers 21 are attached at a first end to the chin bar of the helmet preferably about 1 to 5 inches and more preferably at about 2 inches to the left and right of the helmet's center-line, extend down the front of the driver in generally parallel fashion, and are attached at a second end to the seat belt system's coupling means 111 (FIGS. 4a-4c), such as for example a buckle or cam lock. Preferably, an intermediate portion of the front tethers 21 are attached to the shoulder straps and/or torso belt in order to maintain separation between the front tethers 21 and to offset side-to-side tilting of the driver's head (FIG. 3 shows an intermediate portion of the front tethers 21 stitched to both the shoulder and torso straps 24, 22). That is, as the vehicle accelerates, the wheel may become out of round causing the vehicle to vibrate and the driver's head to tilt side-to-side. By having front tethers 21 attached on opposed sides of the lower, front section of the helmet, the tethers 21 counter acceleration and vibration forces.

The front tethers 21 are preferably taut, without slack, when the tethering system and restraint device 10 are being worn for use. In a less preferred embodiment, there is no more than ½ inch, or no more than ¼ inch of slack, in the front tethers 12. By being taut, the front tethers 21 quickly go into tension during vehicle launch or during vehicle vibration in order to aid the driver in maintaining head control.

It is to be understood that having taut or only a little slack in the front tethers 21 is preferred for drag racing. However, it is contemplated that greater slack may be desirable depending on the type of vehicle, venue and racing conditions. That is, additional slack may be desired where the driver requires greater degrees of movement than that in which taut front tethers 21 would allow, while still benefiting, albeit a reduced benefit, from the front tethers 21 offsetting vibration and acceleration forces.

Figure 10:
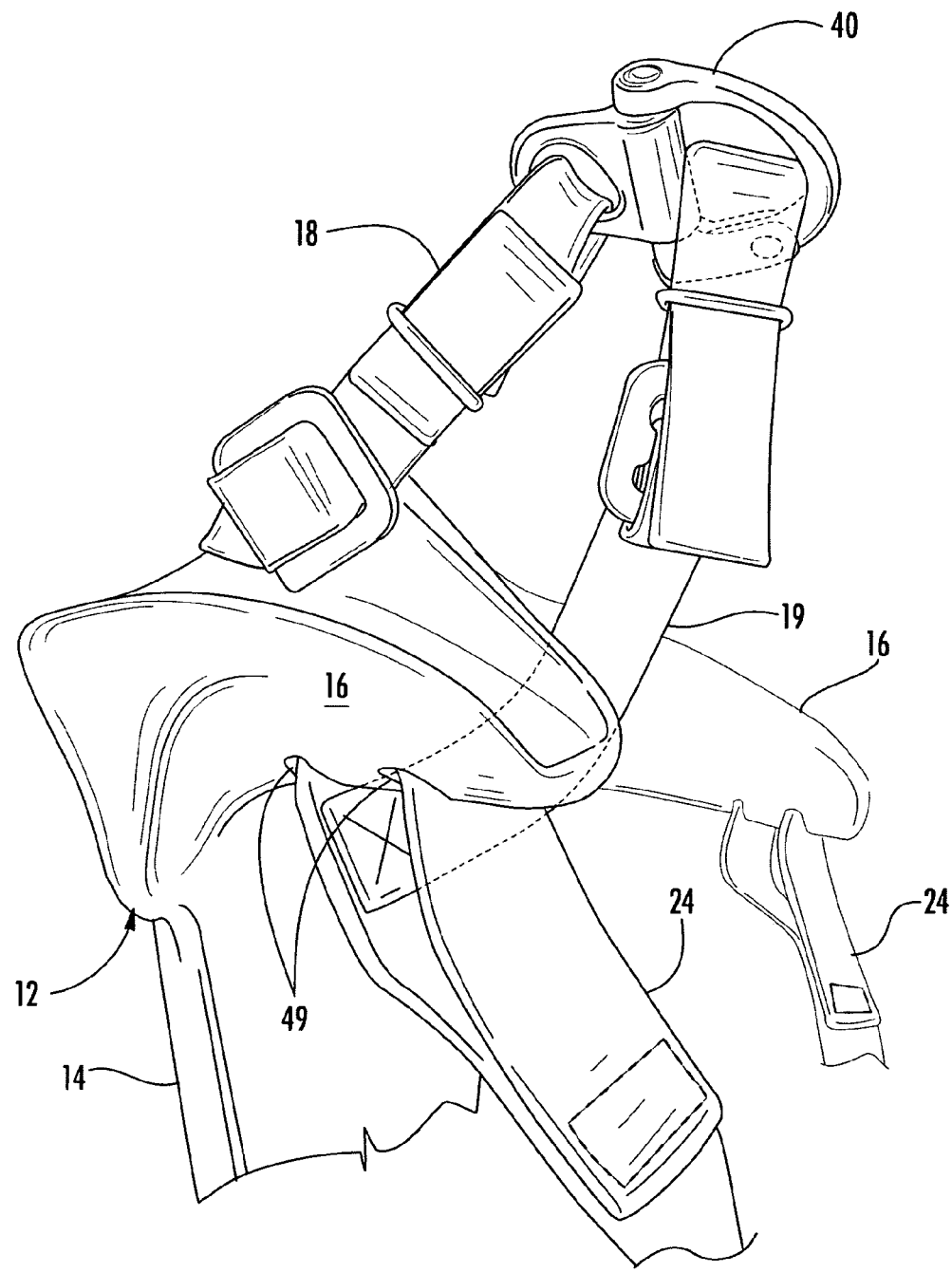
FIG. 10 is a partial perspective view of the tethering system and restraint device of FIG. 1, showing the rear and side tethers on the right hand side of the driver and in particular attachment of the side tether on the right-hand side to the restraint device.
Figure 11:
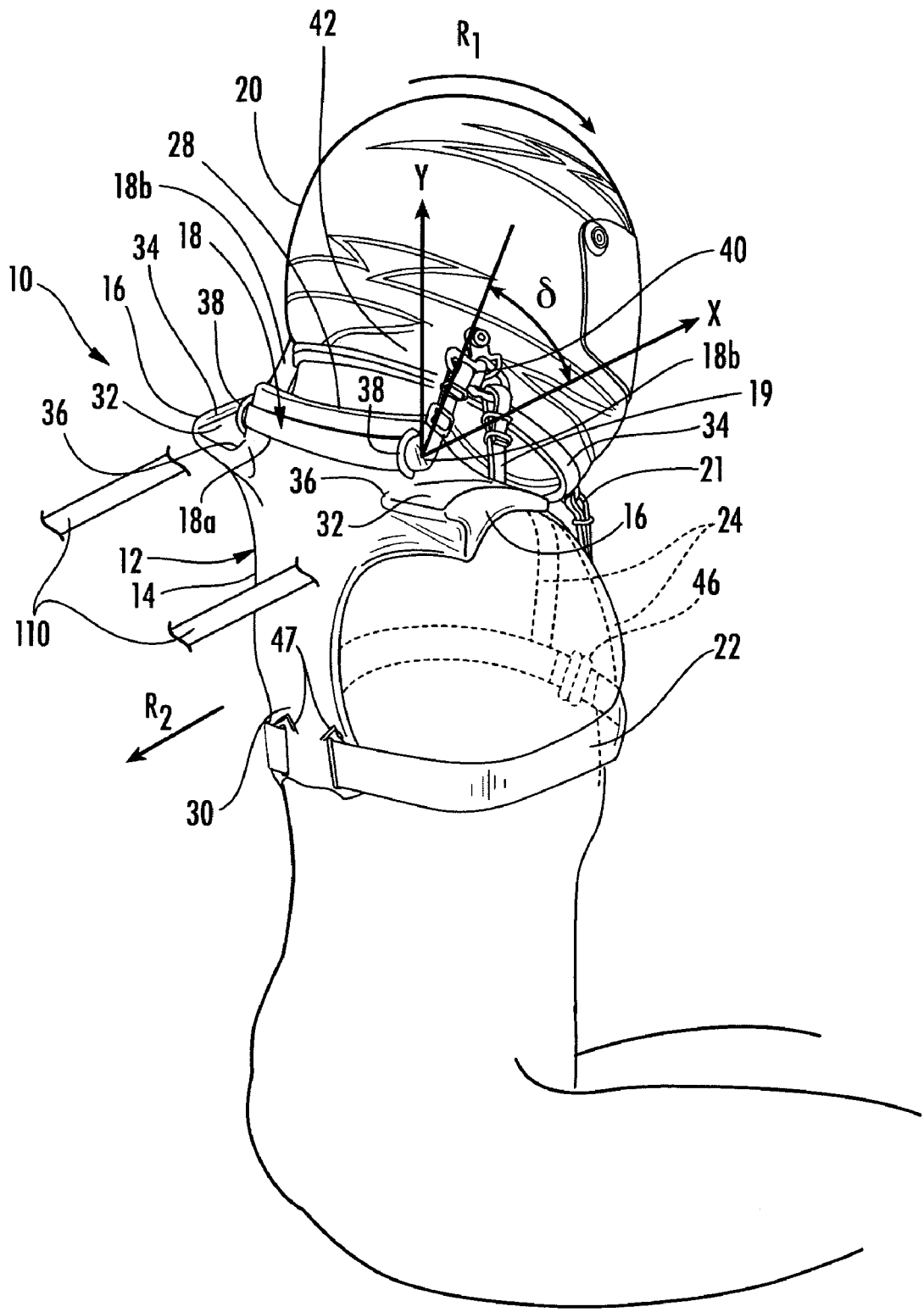
FIG. 11 is a perspective view of an embodiment of a multi-point tethering system in use with a head and neck restraint device. The restraint device includes a support member having back and shoulder portions respectively located along the back and at least partially over the shoulders of the driver and an anchor strap (i.e. chest strap) extending forward around the torso of the driver for anchoring the tethering system and restraint device. The tethering system provides rear, side and front tethers that attach the driver's helmet to the restraint device.
Figure 12:
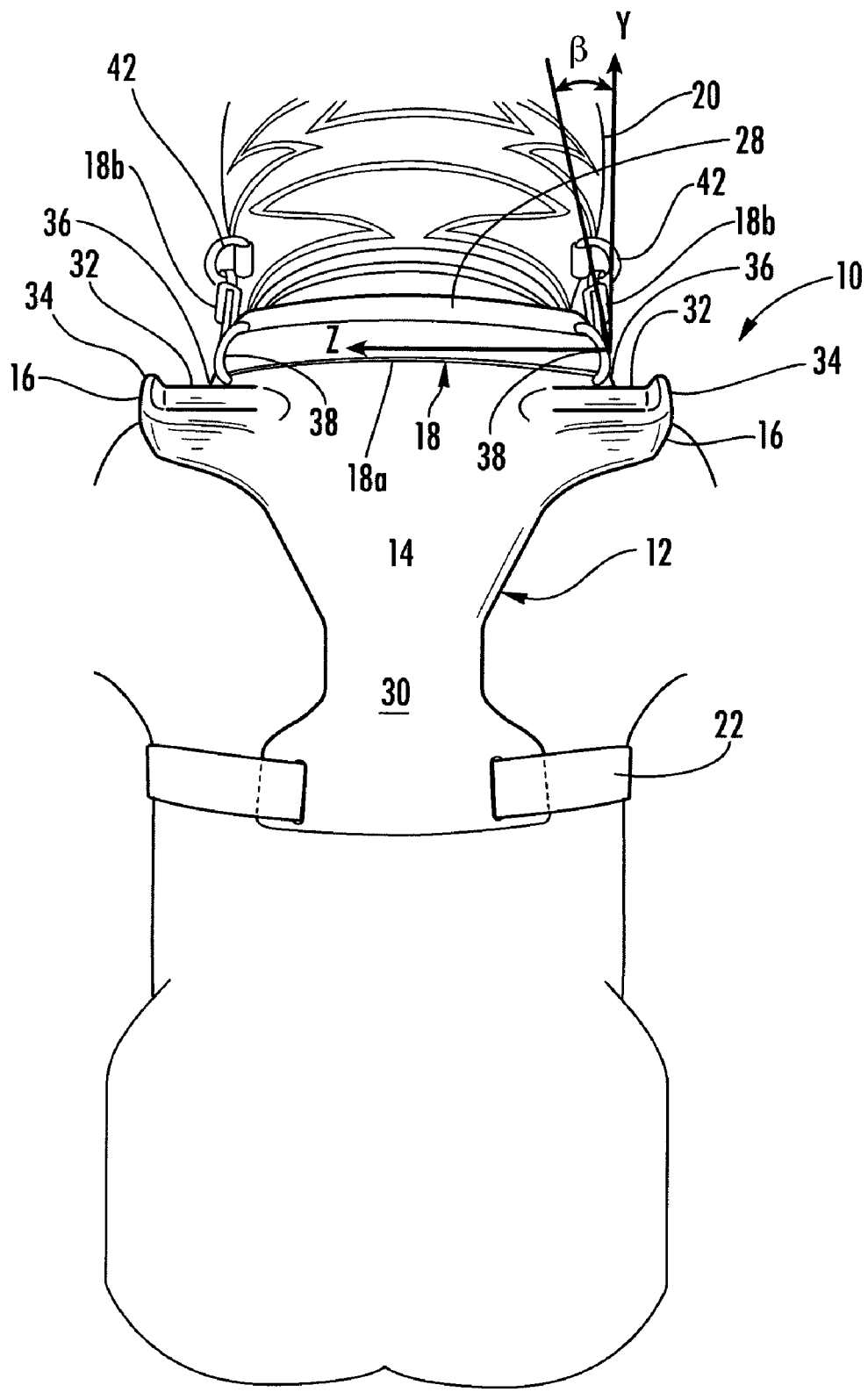
FIG. 12 is a rear view of the tethering system of FIG. 11.
Figure 13:
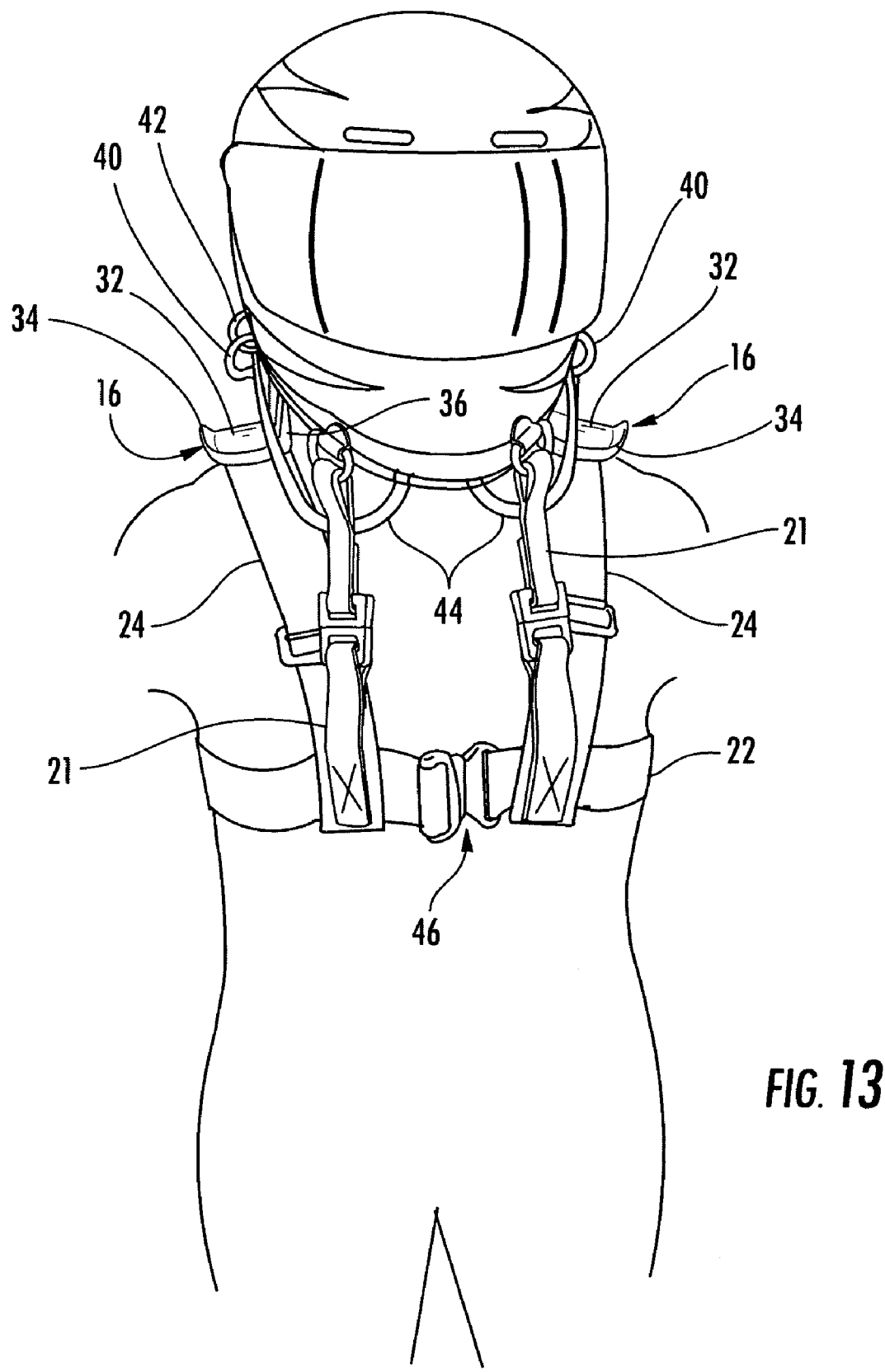
FIG. 13 is a front view of the tethering system of FIG. 11.
Figure 14:
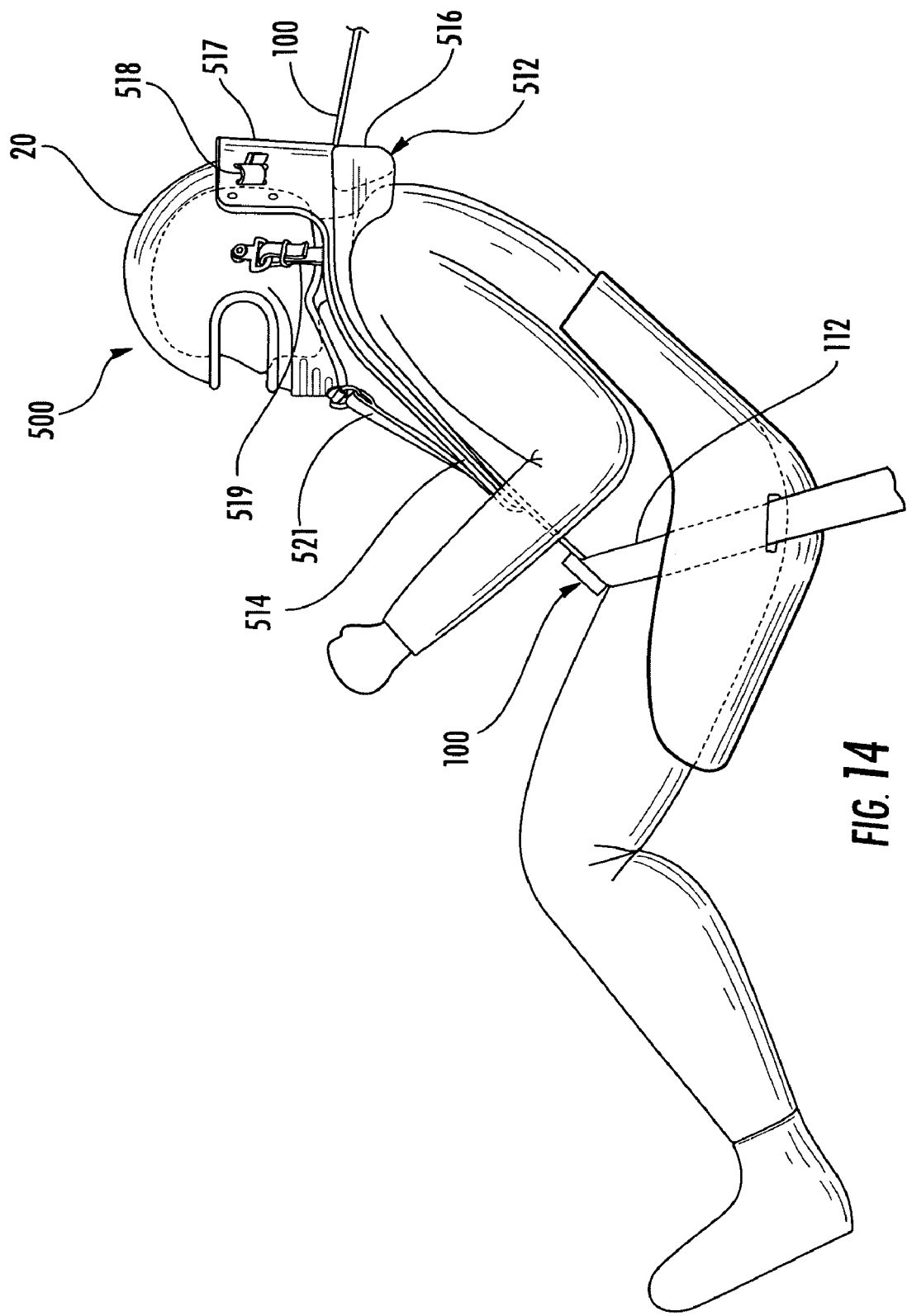
FIG. 14 is a side view of an embodiment of a multi-point tethering system in use with a head and neck restraint device. The restraint device includes a support member having a yoke having two front portions which extend along the driver's torso and a collar which extends upwards from the yoke behind the head. The tethering system provides rear, side and front tethers that attach the driver's helmet to the restraint device and wherein the front tethers are also attached to the vehicle's seat belt assembly.
Figure 15:
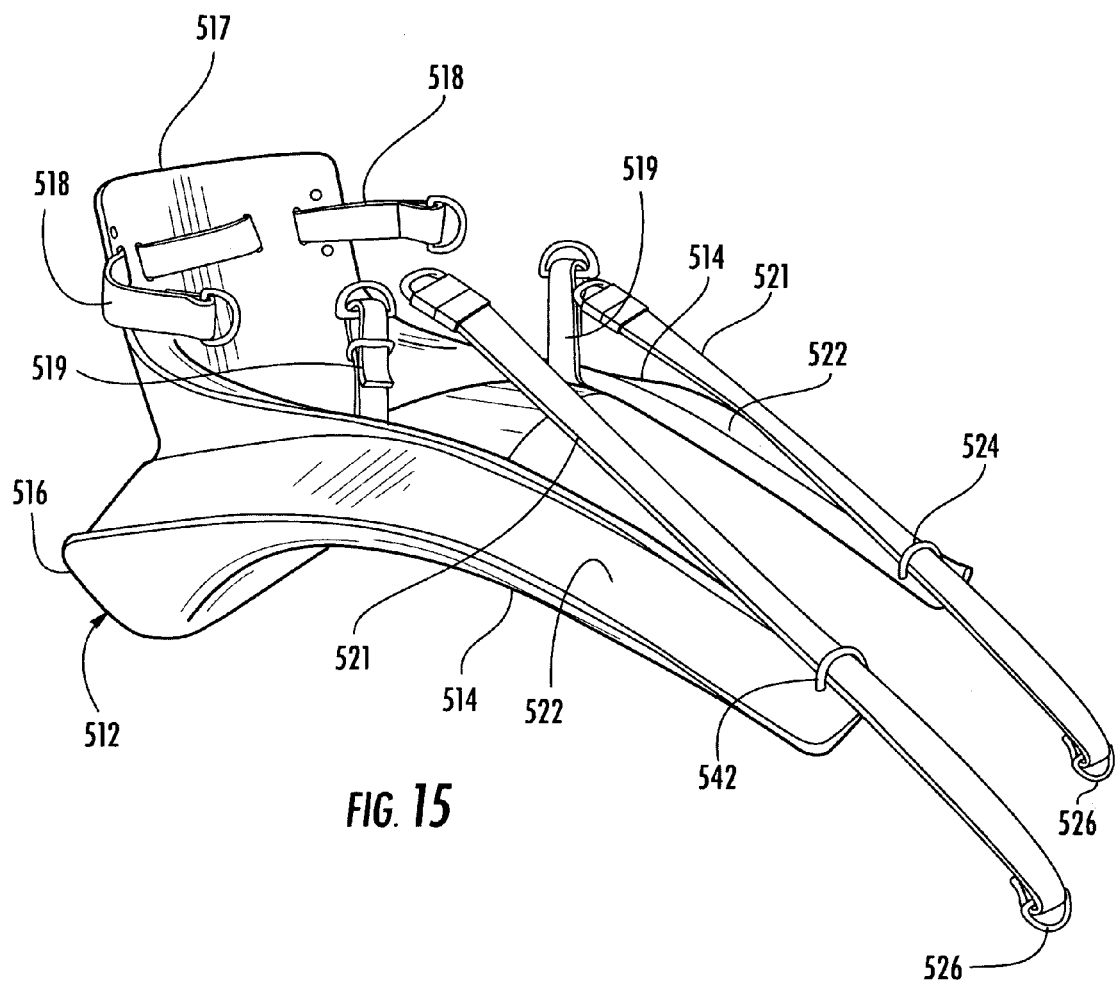
FIG. 15 is a perspective view of the tethering system of FIG. 14, without illustrating the driver or vehicle seat belt assembly.
Figure 16:
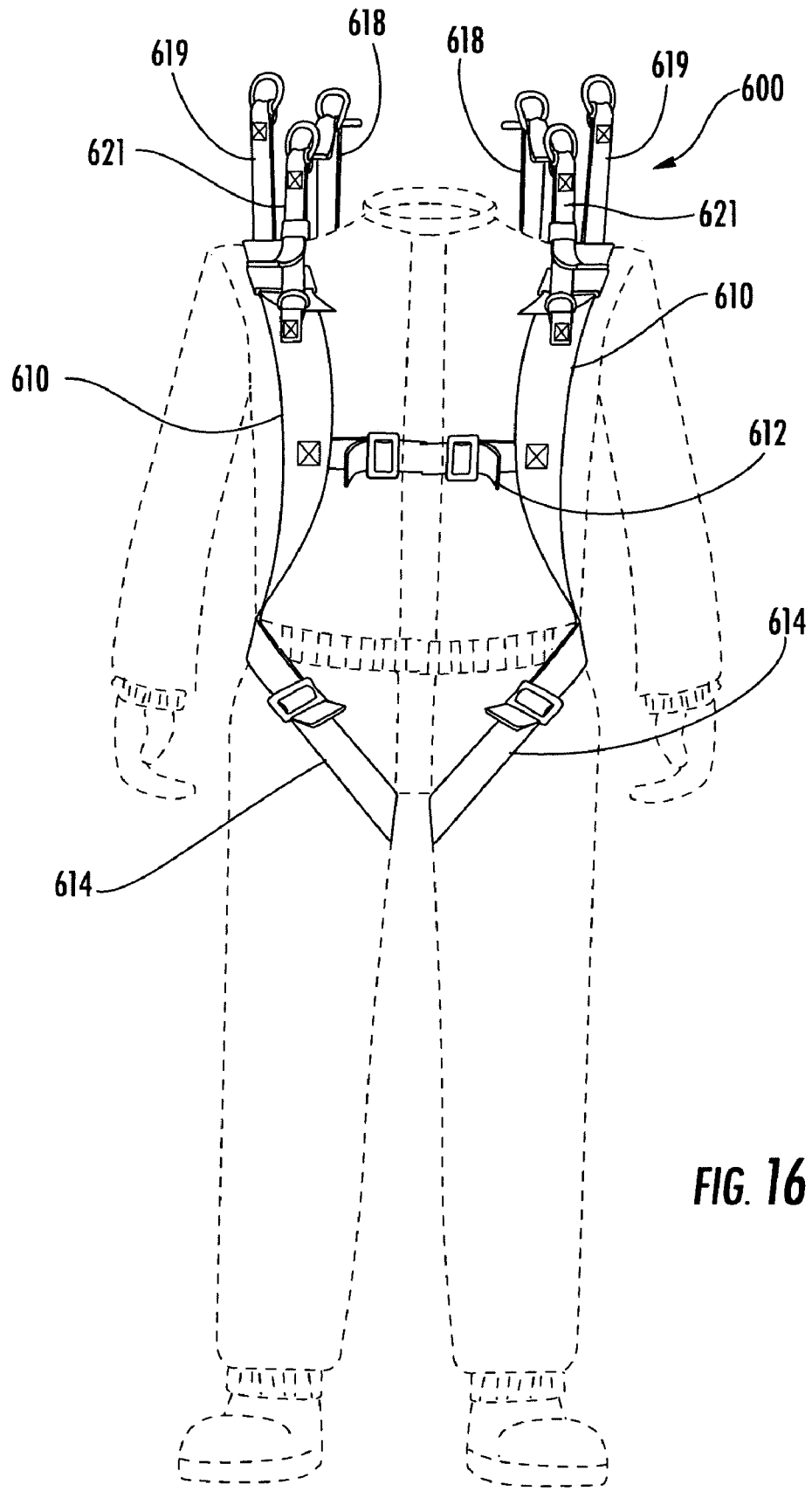
FIG. 16 is a front view of an embodiment of a multi-point tethering system in use with a head and neck restraint device. The restraint device includes a system of straps which are attached to a driver and anchored to the driver's legs. The tethering system provides rear, side and front tethers that attach the driver's helmet to the restraint device.
Figure 17:
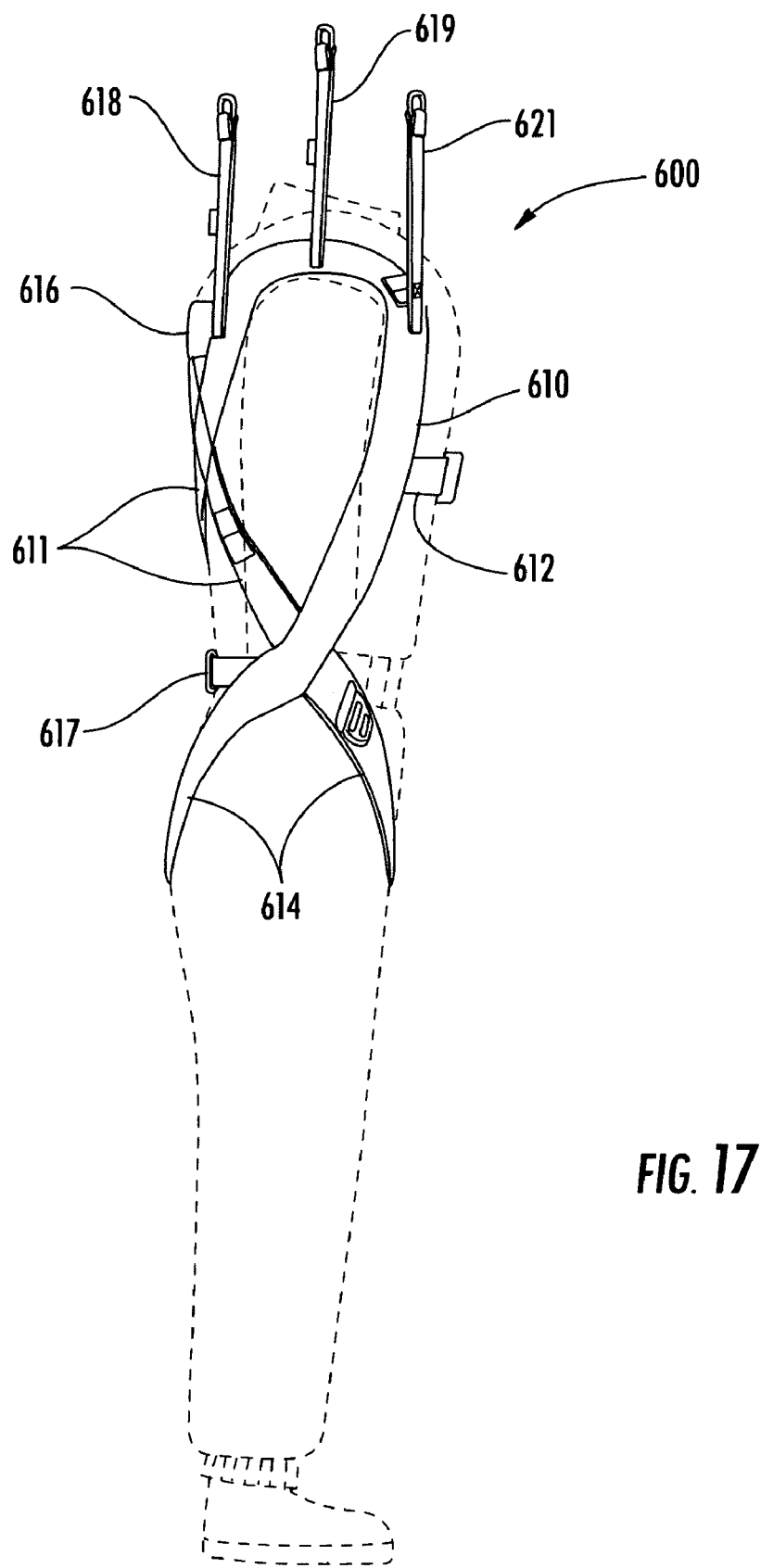
FIG. 17 is a side view of the tethering system of FIG. 16.
Figure 18:
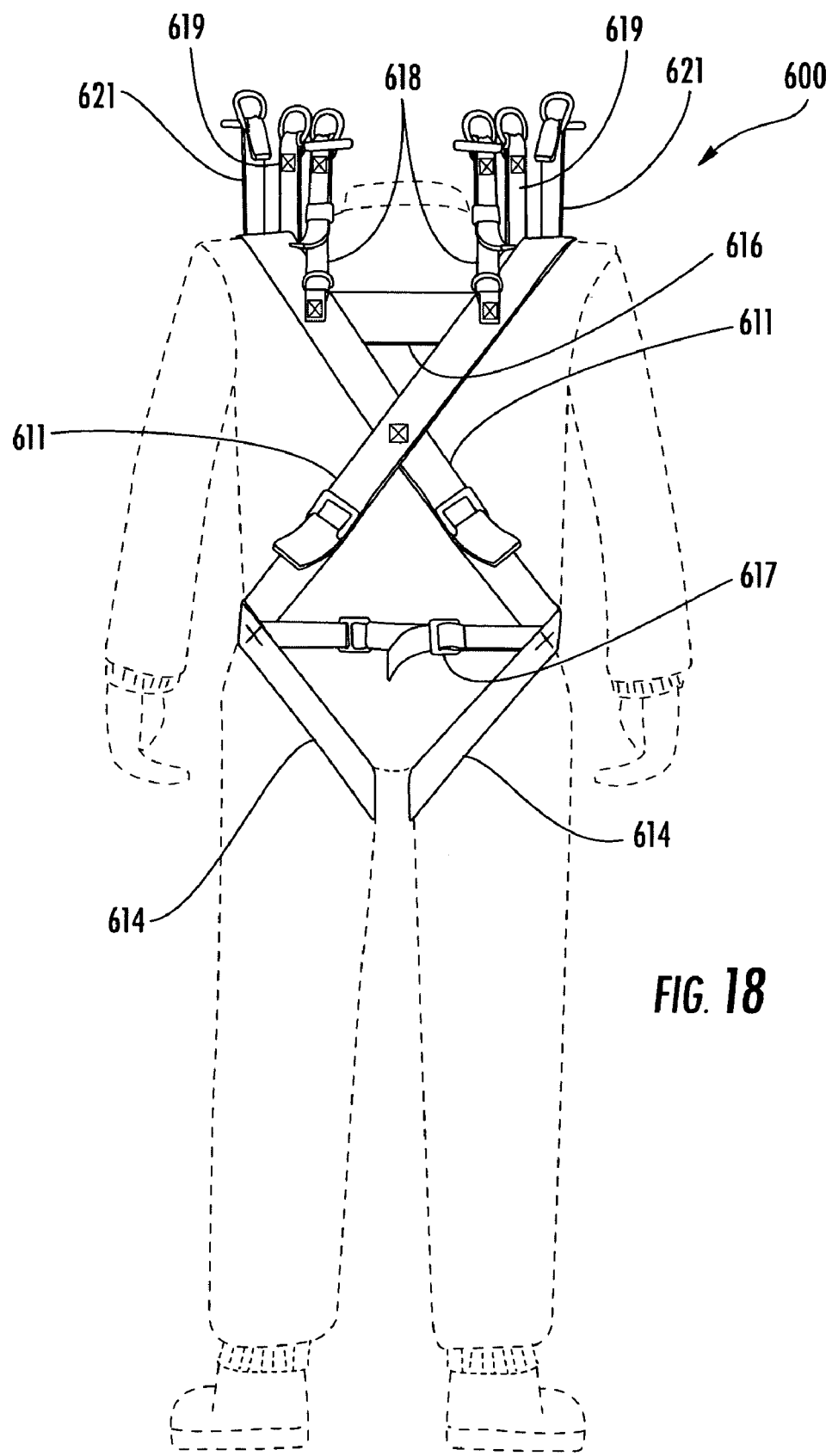
FIG. 18 is rear view of the tethering system of FIG. 17.
Figures 19, 20:
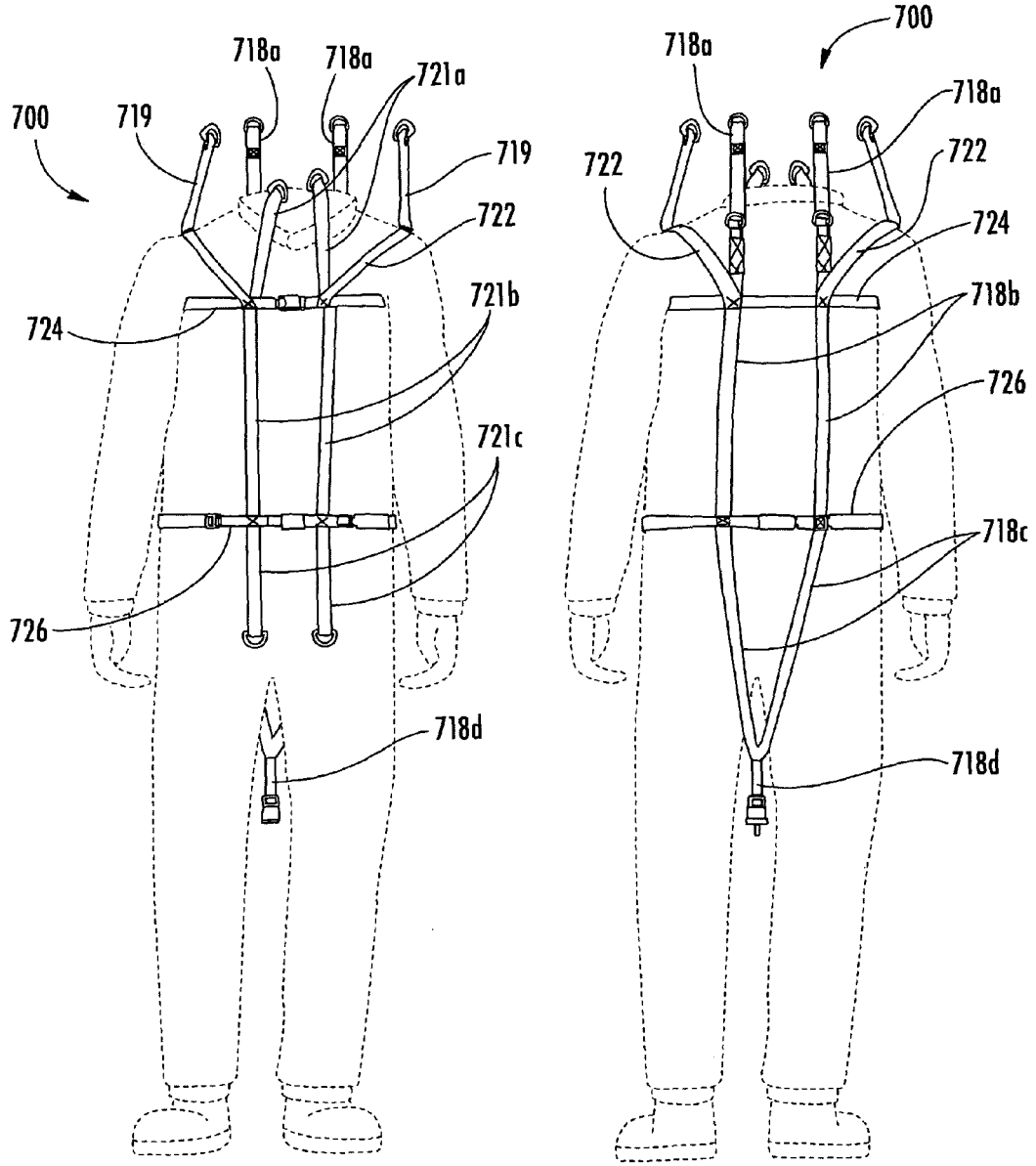
FIG. 19 is a front view of an embodiment of a multi-point tethering system in use with a head and neck restraint device. The restraint device includes a system of straps which are anchored to the vehicle's seat belt assembly. The tethering system provides rear, side and front tethers that attach the driver's helmet to the restraint device and wherein the front tether are attached to the seat belt assembly.
FIG. 20 is a rear view of the tethering system of FIG. 19.

In the preferred embodiment, a pair of side tethers 19 are attached at one end on opposed left and right sides near the lateral centerline of the helmet 20 or further back on the helmet 20 and at the other end to the support member 12 or to the support member 12 via the shoulder straps 24 (FIG. 10 illustrates the right side tether 19 being attached to the shoulder strap 24, which in turn is attached to the support member 16 by being routed through slots 49 in the support member 16. By being stitched to the shoulder strap 24, a simple means of attachment is provided while still having the support member 12 serve as a hard point for the side tether 19. This indirect attachment method is considered to be within the meaning of the term attached as used in this application, whereby the side tethers 19 are considered to be attached to the support member 12. The attachment of the side tethers 19 underneath the support member 12 also serves to further stabilize the side tethers since the vehicle's shoulder belts assist in holding the support member 12 against the driver's shoulders.

In the preferred embodiment, the side tethers 19 extend generally vertically downward from the helmet 20, a position that allows for the side tethers 19 to quickly go into tension and directly oppose vibration forces, side-to-side tilting of the driver's head, and side and angular frontal collisions ("side forces"). The front and side tethers 21, 19 cooperate to counter side forces of the vehicle, thereby aiding the driver in limiting side-to-side tilting or movement of the driver's head. In response to side forces, the front and side tethers 21, 19 counter the forces and head movement by selectively going into tension, whereby forces in either front tether 21 are transmitted to the seat belt assembly 100 via the seat belt couple 111 and forces in either side tether 19 are transmitted to the support member 12 which is anchored by the seat belt assembly and driver's torso.

As with the front tethers 21, the side tethers 19 are preferably taut, without slack, when the tethering system and restraint device 10 are being worn for use. In a less preferred embodiment, there is no more than ½ inch, or no more than ¼ inch of slack, in the side tethers 12. By being taut, the side tethers 21 quickly go into tension during and event that causes side forces in order to aid the driver in maintaining head control.

It is to be understood that having taut or only a little slack in the side tethers 21 is preferred for drag racing. However, it is contemplated that greater slack may be desirable depending on the type of vehicle, venue and racing conditions. That is, additional slack may be desired where the driver requires greater degrees of movement than that in which taut side tethers 21 would allow, while still benefiting, albeit a reduced benefit, from the side tethers 21 in offsetting vibration and side forces.

A rear tether 18 is provided for attaching the restraint device 10 to the helmet 20. For example and as illustrated in FIGS. 1 and 2, attachment there-between may be accomplished by a single tether 18 having an intermediate portion 18a attached to the support member 12 via mechanical clips 38 and opposed end portions 18b equipped with quick release clips 40 for being attached to the helmet 20. Although the single tether 18 may be allowed to slidably move relative to the mechanical clips 38, it is preferred that the tether 18 is affixed by the clips 38 to the support member 12. In another example (not illustrated), the single tether 18 may be replaced with two separate tethers, each affixed at one end to the support member 12 by a mechanical clip (e.g. 38) or the like and adapted at the opposed end for being attached to the helmet 20. That is, the two tether would take be in the same positions as tether end portions 18b. In still another example (not illustrated), a single tether may extend from the support member 12 and attach to only one location at the back of the helmet 20. In each of the above examples, a webbing tie, or other means, may be provided on the tether for length adjustment as necessary.

The specific location of tether attachment to the support member 12 and helmet 20, and its path angle there-between, is based upon several factors, for example the number of tethers being used, the type of vehicle and seat assembly. Regarding tether 18, preferably its left and right end portions 18b angle upwards and forwards from the support member 12 to the helmet 20 during normal operation. In describing the tether angle δ, the angle δ is being considered as if the driver is in an upright seated position. By angling the left and right tether portions 18b upwards and forward, the tether portions 18b are in position to quickly resist forces that occur during a frontal or angular frontal impact and control the driver's head and neck. That is, in the event of an impact, the angle δ of the tethers portions 18b may cause slack to be taken-up rapidly and provides force paths that more directly oppose the deceleration forces. Not to be construed as limiting, a preferred upward and forward angle δ is in the range of 25 to 45 degrees and more preferably in the range of 30 to 40 degrees.

It is also preferred to angle β the left and right tether end portions 18b inwards from the support member 12 to the helmet 20. By angling the left and right tether portions 18b inwards, the tether portions 18b are in position to quickly resist forces that occur during a side or angular frontal impact and control the driver's head and neck. That is, in the event of an impact, the angle β of the tethers portions 18b may cause slack to be taken-up rapidly and provides force paths that more directly oppose the deceleration forces. Not to be construed as limiting, a preferred inward angle β is in the range of 10-15 degrees. As it will be appreciated by those skilled in the art, limitation due to the seat assembly and headrest may require that the rear tethers portions 18b are directly forward at no angle, angled outward, or any angle there-between.

As it will be appreciated by those skilled in the art, where two separate tethers are used instead of the single tether 18, the separate tethers preferably extend from the support member 12 to the helmet 20 in the same upward and forward angle δ, and the same inward angle β, as the aforementioned described the left and right end portions 18b.

Referring to FIGS. 1-3, the quick release clips 40 provide releaseable attachment to D-rings 42 mounted on the helmet 20. This arrangement allows for the restraint device 10 to be quickly released from the helmet 20 by pulling clip lines 44 (FIG. 3), thereby opening the quick release clips 40 for detachment from the helmet D-rings 42. It is noted that the clip lines 44 may be taped to the chin portion of the helmet 20, as shown, in order to quickly locate the lines 44 as needed, and to avoid the lines from becoming inadvertently entangled in the seat belt assembly or restraint device 10.

Referring to FIGS. 1-3, the anchor strap includes the torso anchor strap 22 and/or seat belt anchor strap 23, which anchors the device to the driver's upper torso and seat belt assembly. The restraint device 10 may be configured without the torso anchor strap 22 or the seat belt anchor strap 23, however the utilization of both in combination yield superior results.

The torso anchor strap 22 is preferably attached to the second section 30 of the support member 12, having sufficient length to encircle the driver's torso about the chest. Opposed terminal ends of the torso anchor strap 22 are releaseably coupled together by complementary tongue and buckle assembly 46 or other suitable means, which may be adjusted to ensure a snug fit to the driver.

The torso anchor strap 22 anchors the restraint device 10 to the driver's torso, whereby deceleration forces that cause the driver's head to move in a forward and downward direction (illustrated in FIG. 1 by arrow labeled $R_1$) are transferred through the support member 12, then torso anchor strap 22, for being resisted by the driver's mass.

Referring to FIGS. 1 and 3, the restraint device 10 also includes shoulder straps 24 that attach the shoulder portions 16 to the torso anchor strap 22. The shoulder straps 24 assist in maintaining the restraint device 10 in operational position during a collision event and provide pathways along the front of the driver through which forces are directed to the torso anchor strap 22.

Figure 4A:
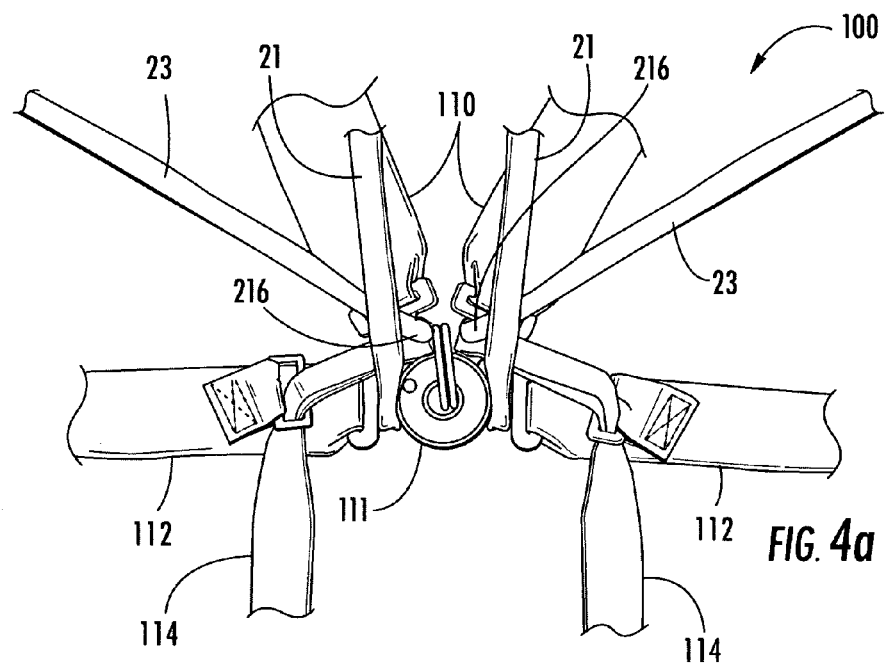
FIG. 4a is a fragmented front view of the restraint device of FIG. 1, showing in particular an arrangement for anchoring the tethering system and restraint device to the vehicle's seat belt assembly, wherein the anchor straps are secured to the seat belt assembly by shoulder belts and the front tethers are secured to the seat belt assembly by a lap belt.
Figure 4B:
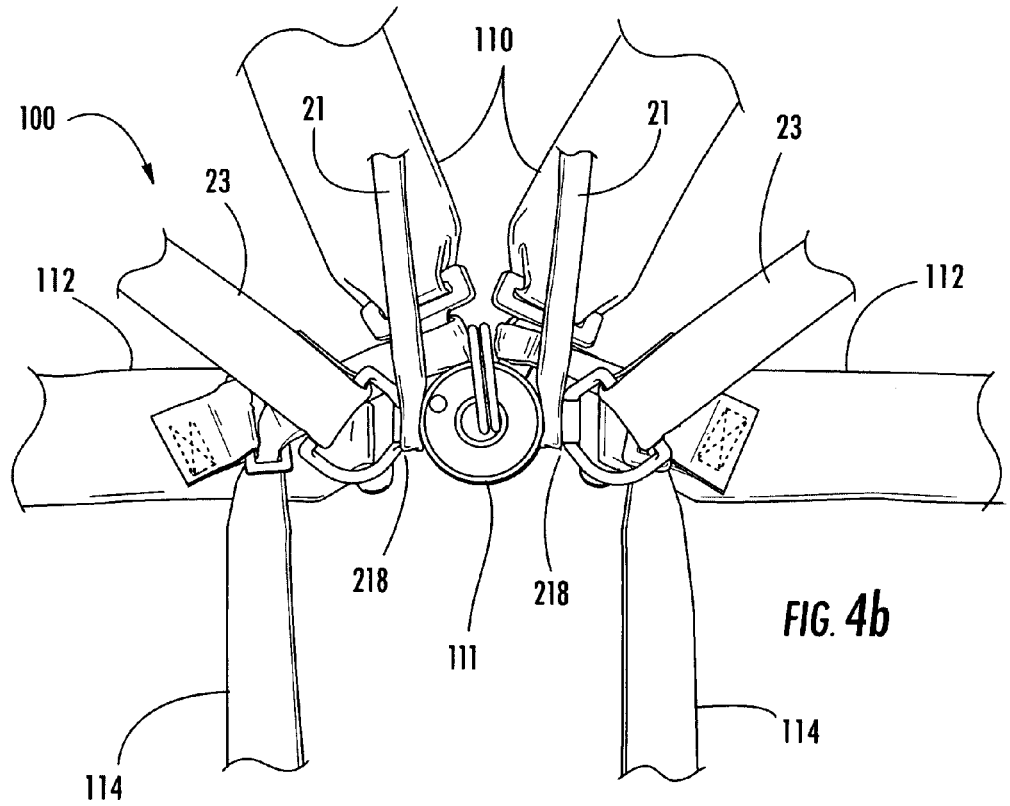
FIG. 4b is a fragmented front view of the restraint device of FIG. 1, showing in particular another arrangement for anchoring the tethering system and restraint device to a vehicle's seat belt assembly, wherein the anchor straps and front tethers are secured to the seat belt assembly by a lap belt.
Figure 4C:
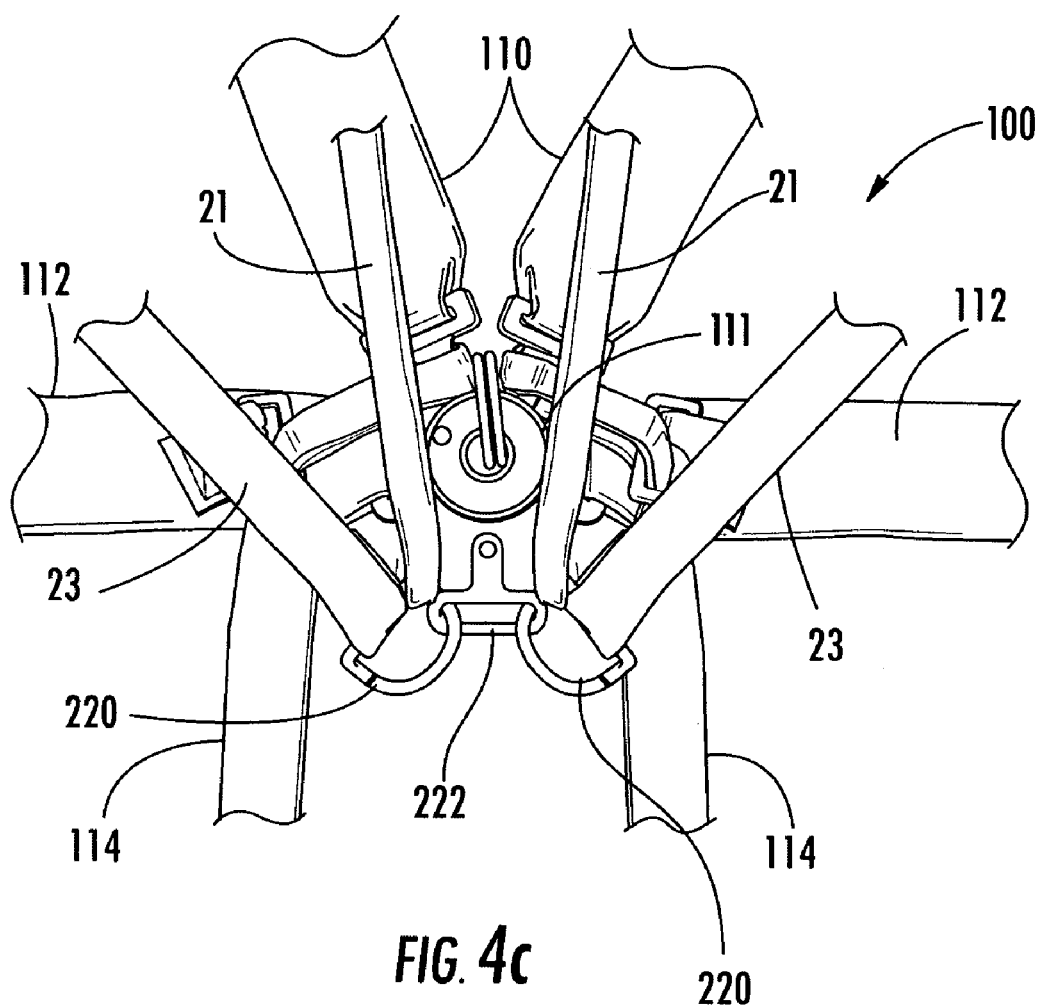
FIG. 4c is a fragmented front view of the restraint device of FIG. 1, showing in particular a further arrangement for anchoring the tethering system and restraint device to the vehicle's seat belt assembly, wherein the anchor straps are secured to the seat belt assembly by being clipped into a camlock and the front tethers are secured to the seat belt assembly by a lap belt.
Figure 5:
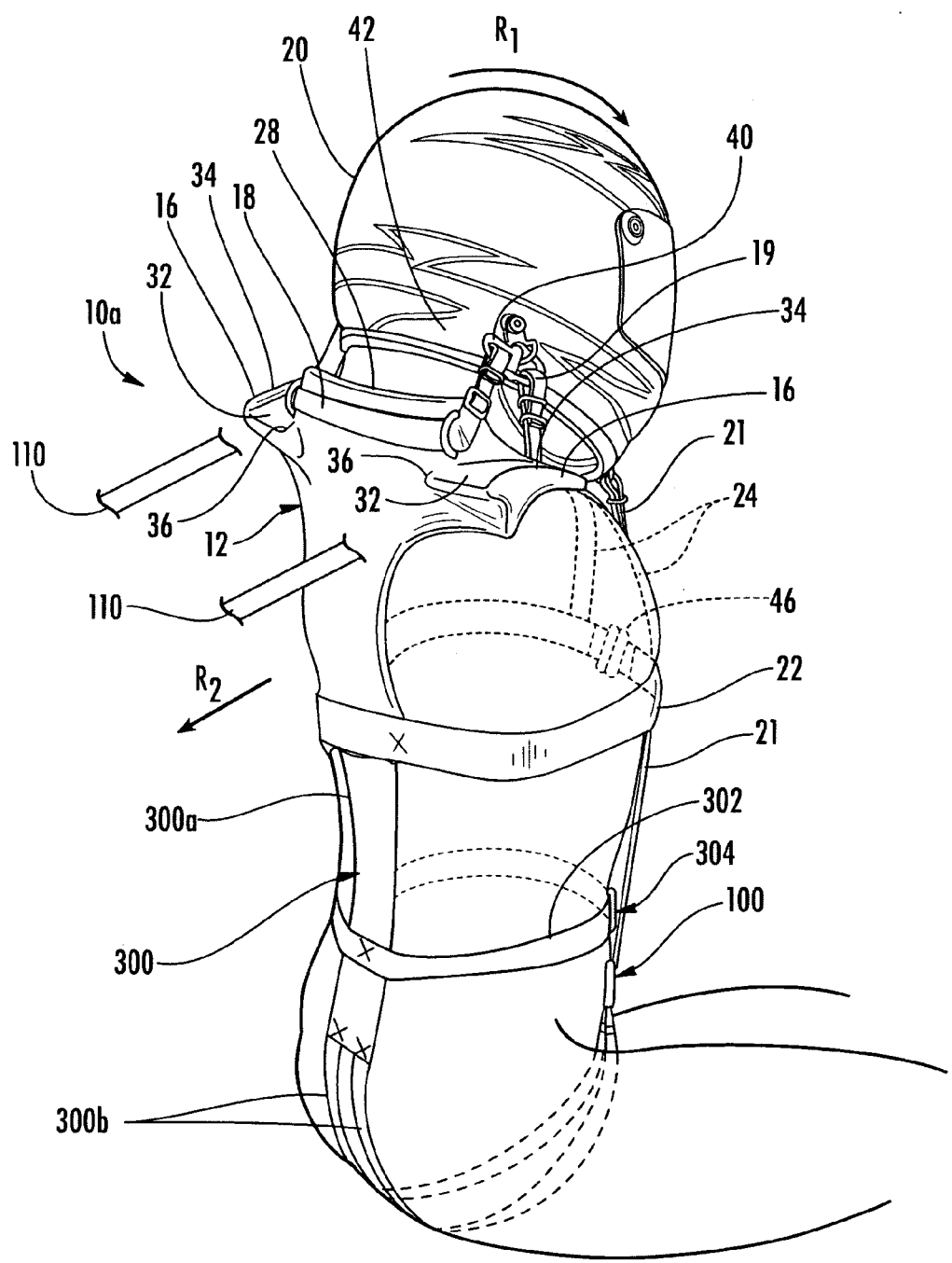
FIG. 5 is a perspective view of another embodiment of a multi-point tethering system in use with a head and neck restraint device. The restraint device includes a support member having back and shoulder portions respectively located along the back and at least partially over the shoulders of the driver and anchor straps extending forward between the driver's legs for attaching the support member to a vehicle's seat belt assembly (seat belt assembly is partially shown). The tethering system provides rear, side and front tethers that attach the driver's helmet to the restraint device and wherein the front tethers are also attached to the vehicle's seat belt assembly.
Figure 6:
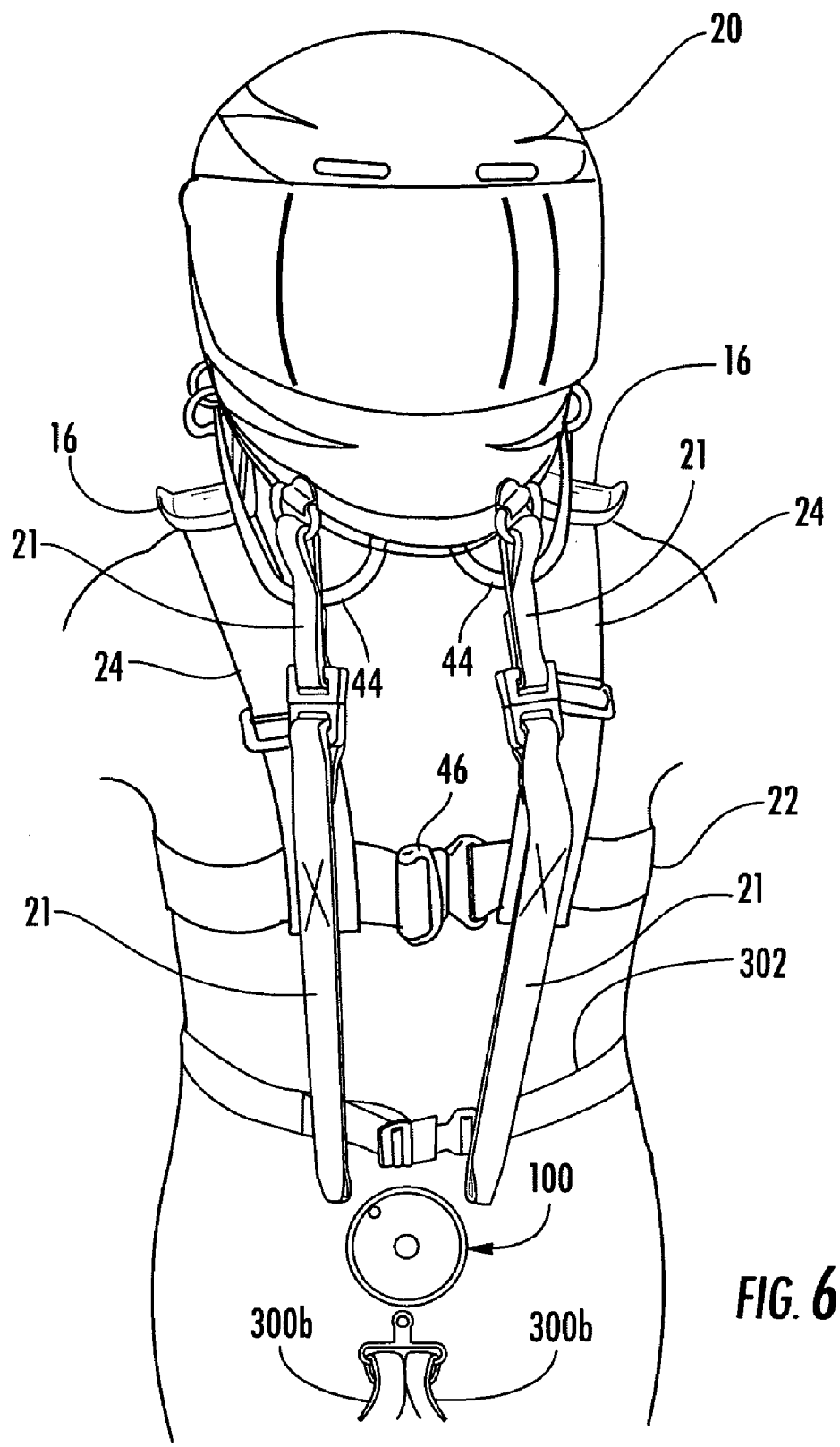
FIG. 6 is a front view of the tethering system of FIG. 5.
Figure 7A:
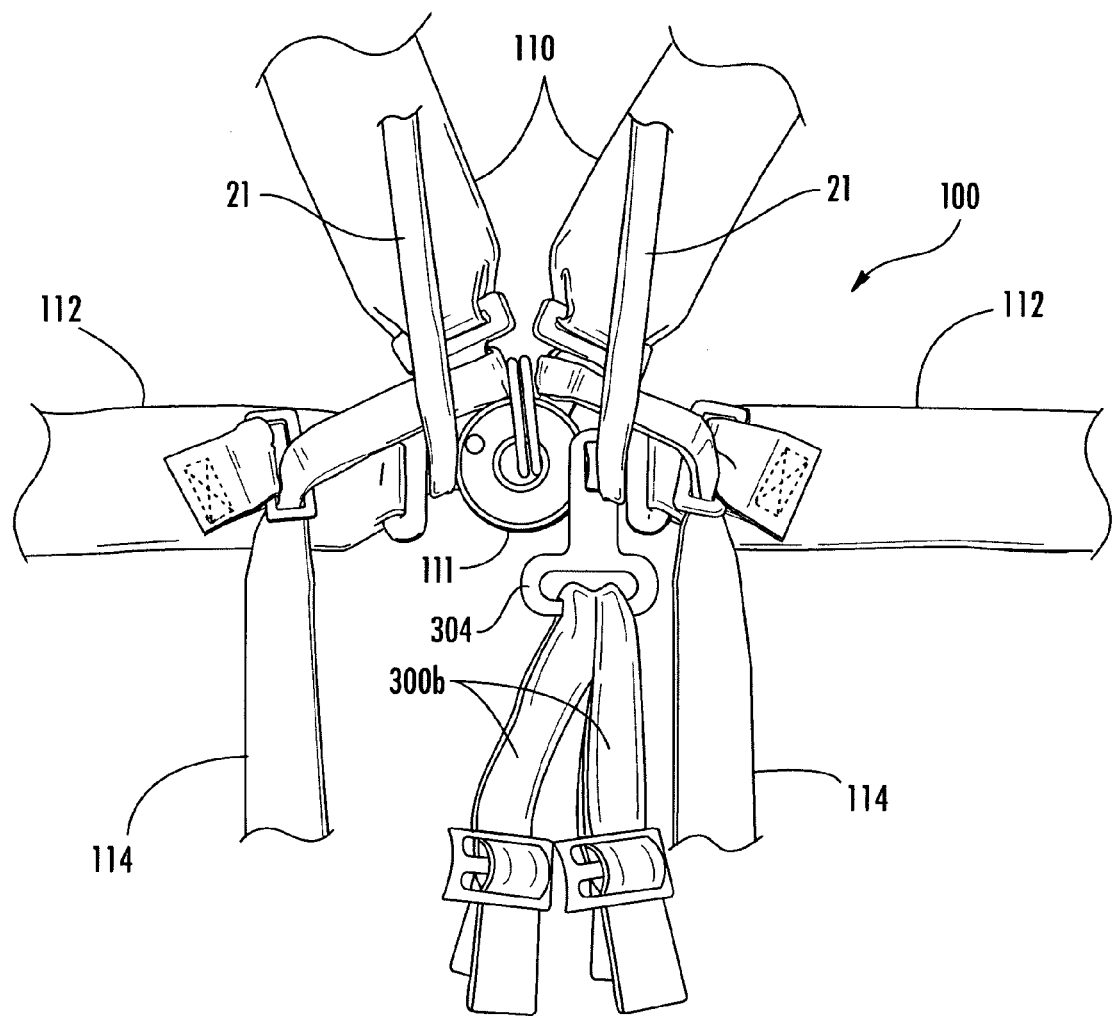
FIG. 7a is a fragmented front view of the restraint device of FIG. 5, showing in particular an arrangement for anchoring the tethering system and restraint device to the vehicle's seat belt assembly, wherein the anchor straps and front tethers are secured to the seat belt assembly by a lap belt.
Figure 7B:
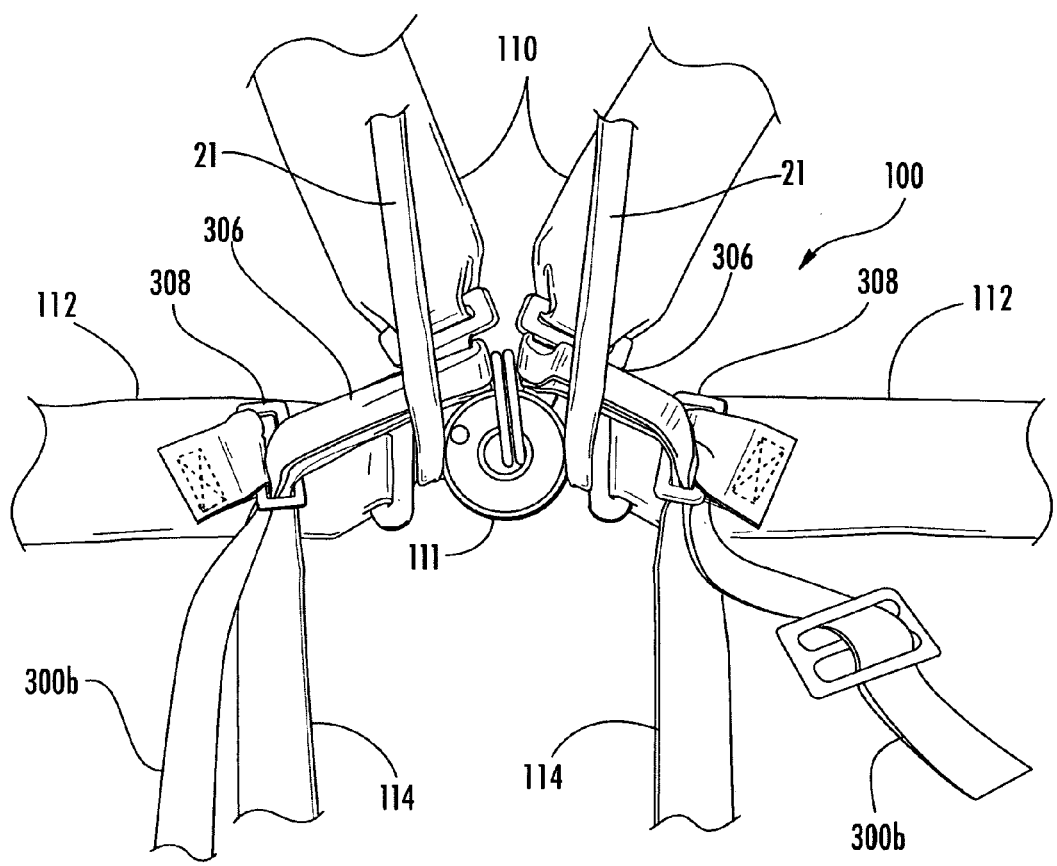
FIG. 7b is a fragmented front view of the restraint device of FIG. 5, showing in particular another arrangement for anchoring the tethering system and restraint device to a vehicle's seat belt assembly, wherein the anchor straps are secured to the seat belt assembly by shoulder belts and the front tethers are secured to the seat belt assembly by a lap belt.
Figure 7C:
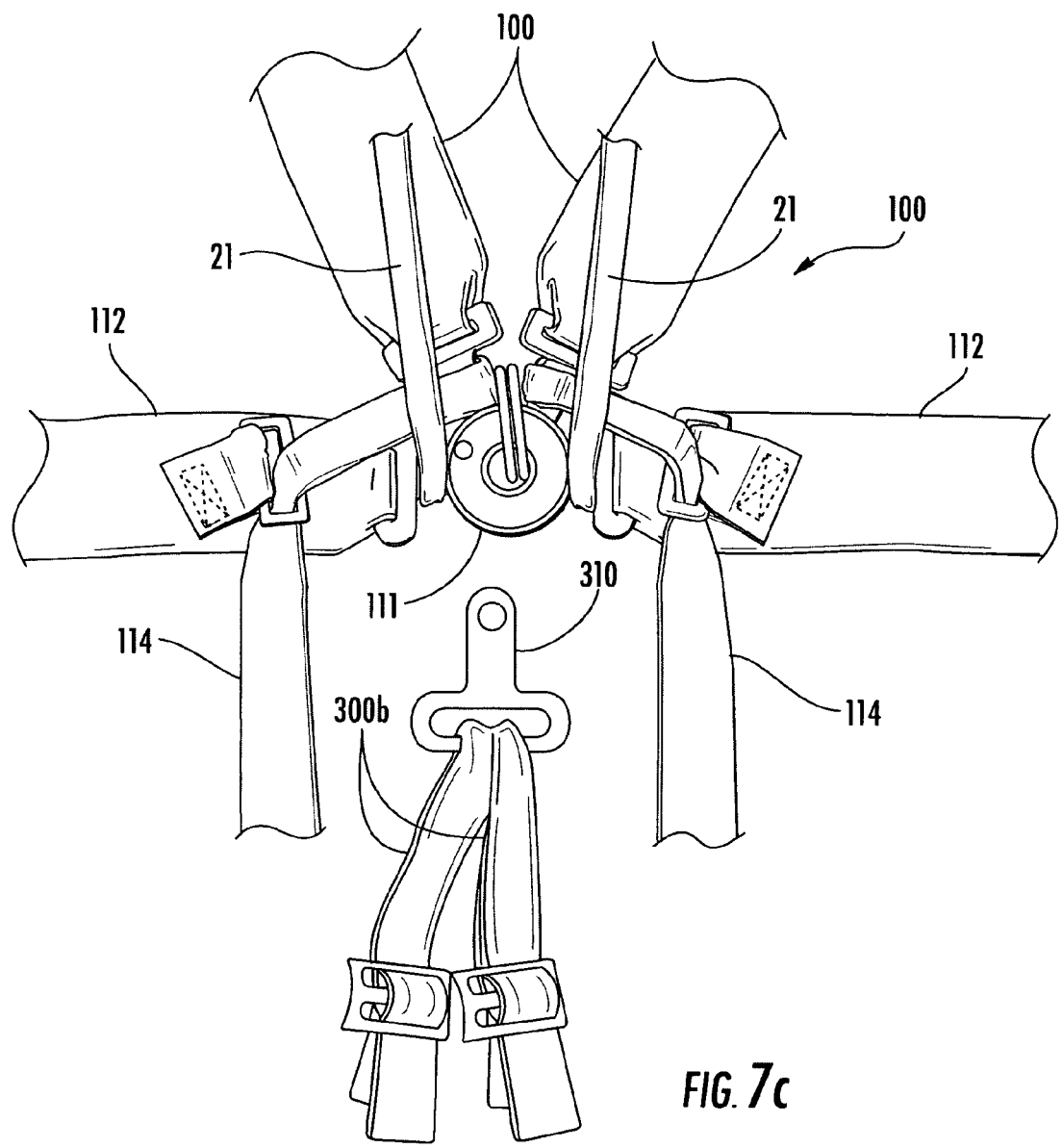
FIG. 7c is a fragmented front view of the restraint device of FIG. 5, showing in particular a further arrangement for anchoring the tethering system and restraint device to the vehicle's seat belt assembly, wherein the anchor straps are secured to the seat belt assembly by being clipped into a camlock and the front tethers are secured to the seat belt assembly by a lap belt.
Figure 8:
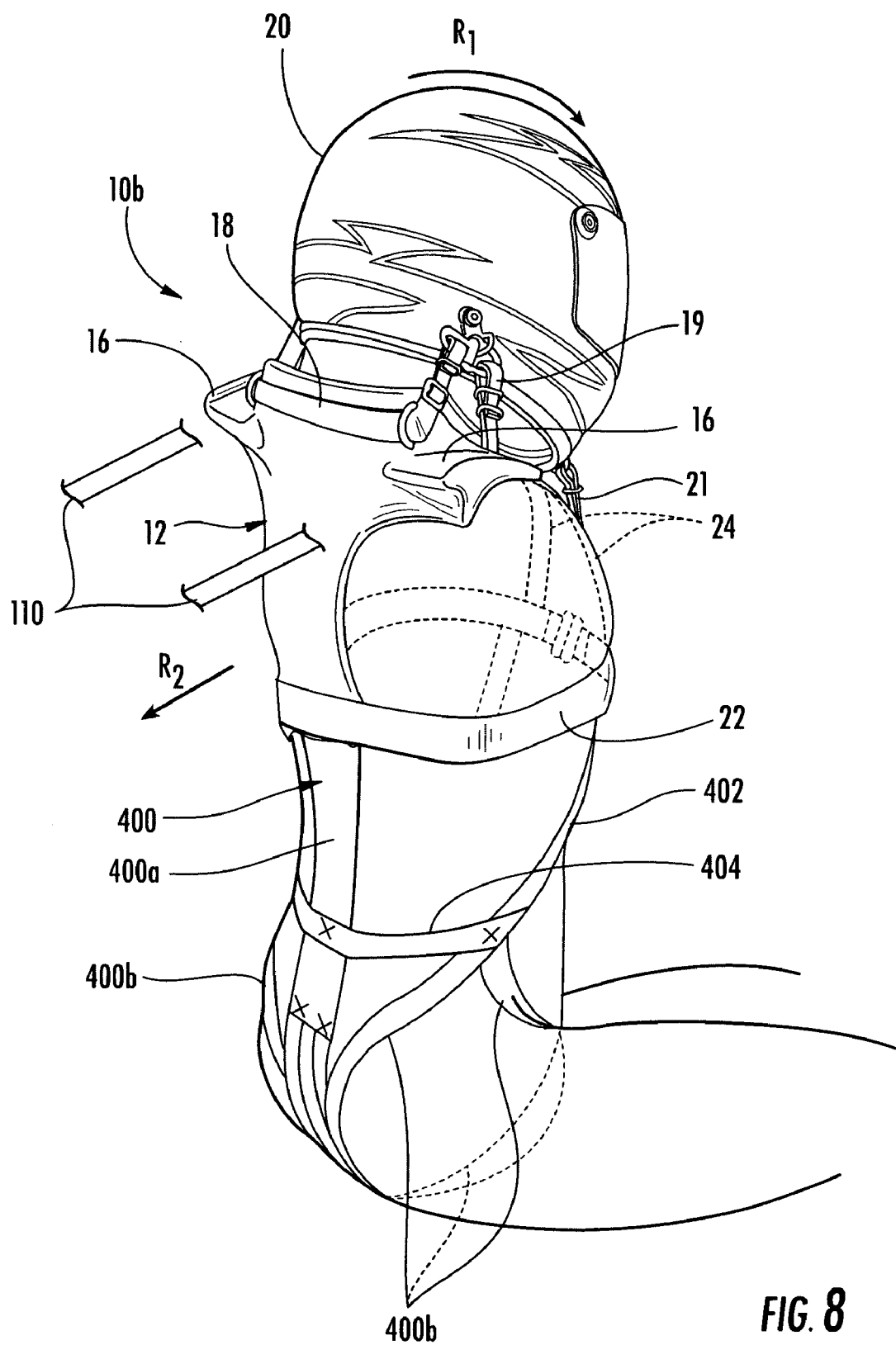
FIG. 8 is a perspective view of an embodiment of a multi-point tethering system in use with a head and neck restraint device. The restraint device includes a support member having back and shoulder portions respectively located along the back and at least partially over the shoulders of the driver and anchor straps extending at least partially around the driver's legs for anchoring the tethering system and restraint device. The tethering system provides rear, side and front tethers that attach the driver's helmet to the restraint device.
Figure 9:
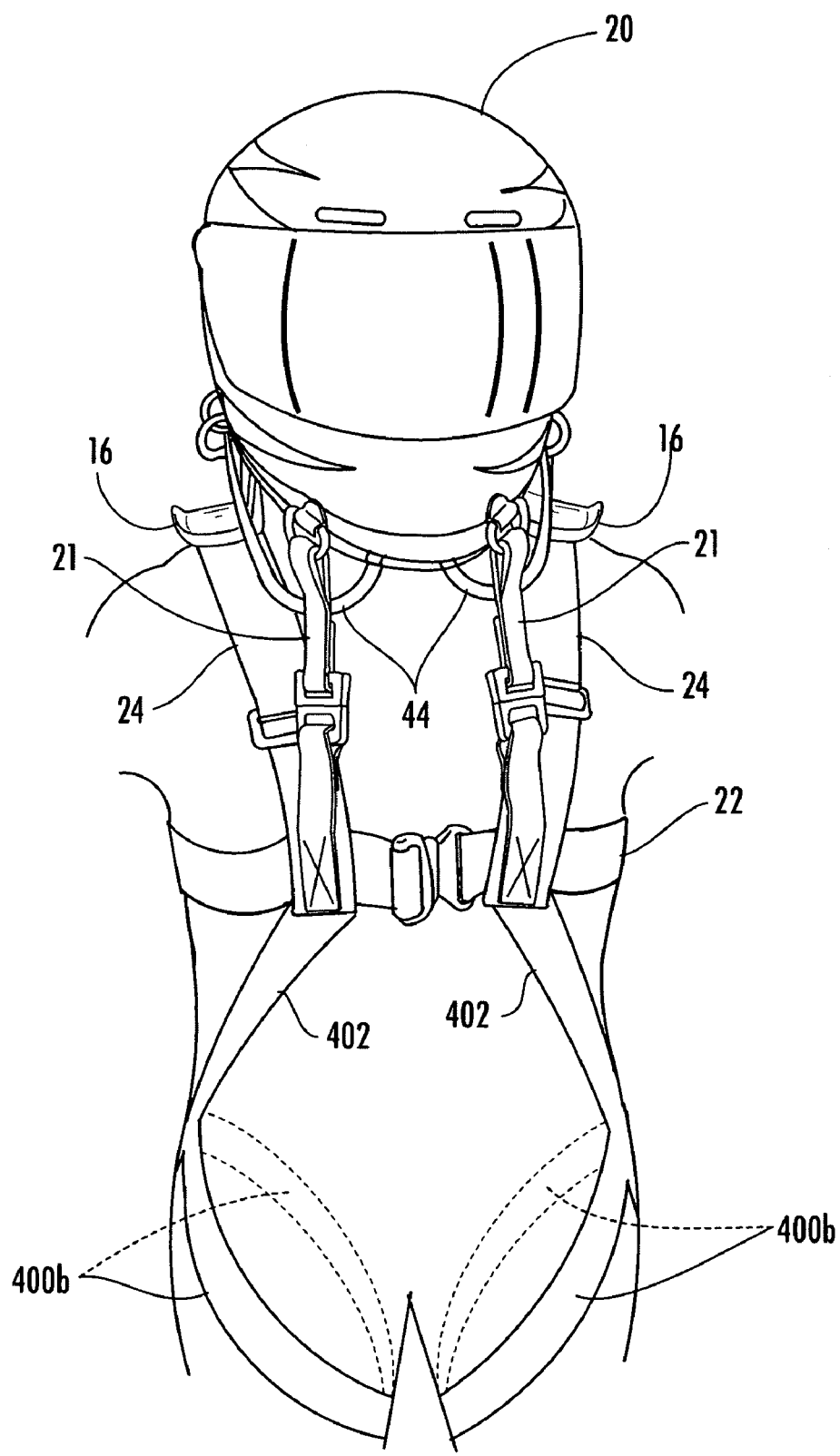
FIG. 9 is a front view of the tethering system of FIG. 8.

Referring to FIGS. 1 and 2, the seat belt anchor strap 23 is configured for anchoring the device 10 to the vehicle's seat belt assembly 100 (FIGS. 4a-4c). In the preferred embodiment, the anchor strap 23 is comprised of two straps 23, each attached at one end to the support member 12 by being passed through respective slots 47, and having a second end that extends around respective left and right sides the driver's waist for being attached to the seat belt assembly 100. In an alternative embodiment (not illustrated), a single seat belt anchor strap is utilized instead of the illustrated two separate straps. In this alternative configuration, the single seat belt anchor strap has an intermediate portion that extends between the slots 47, and opposed end portions that extend forward over the driver's waist to the seat belt assembly 100 in the same fashion as the aforementioned separate anchor straps 23.

Referring to FIG. 3, a pair of optional connector straps 26 may be provided, attached at one end to the torso anchor strap 22 at the other end to the seat belt anchor strap 23. The connector straps 26 assist in maintaining positioning of the seat belt anchor strap 23 for attachment to the seat belt assembly 100 as the driver enters the vehicle. The connector straps 26 may also be part of a pathway for distribution forces during an impact to the anchors (mass of drive and seat belt assembly 100). That is, during a impact event, forces being transmitted through the shoulder straps 24 may be transmitted i) through torso anchor strap 22 for being anchored by the driver's torso, and also ii) through the torso anchor strap 22, connector straps 26 and seat belt anchor strap 23 for being anchored by the vehicle's seat belt assembly 100. These pathways through which forces are transferred are referred herein as secondary pathways, since these are not the pathways principally utilized during for opposing deceleration forces and control the driver's head during an impact.

The device 10 also provides principal pathways, wherein deceleration forces transmitted to the support member 12 are directly transferred to the torso anchor strap 22 and seat belt anchor strap 23 and anchored by the driver's body and seat belt assembly 100, respectively. The combination of secondary and principal pathways allow forces to be transferred along the front and rear of the driver, by a variety of paths, to at least one anchor, thereby controlling the driver's head and neck under a variety of impact conditions.

FIGS. 4a-4c are exemplary of different ways in which the seat belt anchor strap 23 and the front straps 21 may be attached to the seat belt assembly 100. The illustrated seat belt assembly 100 is a standard five or six point seat belt assembly 100 commonly used in high-performance vehicle racing for securing a driver to the seat assembly and includes a coupling means, such as a cam lock 111, to secure the various belts. As it will be appreciated by those skilled in the art, in each embodiment herein, the driver is released from attachment to the vehicle by merely decoupling the vehicle's seat belt assembly. It is to be understood that the examples provided herein are not exhaustive and merely illustrative of preferred arrangements and, hence, the teachings are applicable to other seat belt assemblies and to other coupling means, for example buckles as commonly used in the racing industry.

Referring to FIGS. 4a-4c, the seat belt assembly 100 comprises shoulder belts 110, lap belts 112 and sub-belts 114 for securing a driver to the seat belt assembly 100. Each of the belts 110, 112, 114 has a tongued end for releaseably attaching the respective belt to the cam lock 111.

In the example illustrated by FIG. 4a, the seat belt anchor strap 23 has looped ends 216 through which tongues of the shoulder belts 110 may be received. As such, by securing the shoulder belts 110 to the cam lock 111, the strap 23 is also secured to the seat belt assembly 100. Likewise, the anchor strap 23 is detached from the seat belt assembly 100 by releasing the seat belts from the cam lock 111.

In the example illustrated by FIG. 4b, the seat belt anchor strap 23 is provided with D-rings 218 through which the lap belts 112 may be received. Accordingly, by securing the lap belt 112 to the cam lock 111, the strap 23 is also secured to the seat belt assembly 100.

Referring to FIG. 4c, another example is provided wherein the anchor strap 23 is attached to D-rings 220, which are coupled to a common tongue 222. The tongue 222 may be attached into the cam lock 111 in order to secure the strap 23 to the seat belt assembly 100.

In each of the above described attachment arrangements, the anchor strap 23, and thus the restraint device 10, is detached from the vehicle by simply uncoupling the seat belts from the cam lock 111.

That which is claimed is:

1. A system of tethers and a helmet cooperating with the tethers for controlling a driver's head during operation of a vehicle, comprising:
   at least one front tether for attachment to the chin bar of the helmet and to a vehicle's seat belt assembly;
   a pair of side tethers for attachment to the sides of the helmet and to a head and neck restraint device;
   at least one rear tether for attachment to the side or rear of the helmet and to the head and neck restraint device; and
   wherein the front and side tethers have ½ inch of slack or less during normal operation.

2. A system of tethers and a helmet cooperating with the tethers for controlling a driver's head during operation of a vehicle, comprising:
   at least two front tethers having first ends for attachment to the helmet and second ends for attachment to shoulder straps, a torso strap and/or a vehicle's seat belt assembly;
   a pair of side tethers for attachment to the sides of the helmet and to a head and neck restraint device;
   either at least two rear tethers having first ends for attachment to the helmet and second ends for attachment to shoulder straps or a support member or a single rear tether having an intermediate portion attached to a support member and opposed end portions for attachment to the helmet; and
   wherein the front and side tethers have ½ inch of slack or less during normal operation.

3. The system of claim 1, wherein the length of the front and side tethers are adjustable such that the side tethers have ½ inch of slack or less during normal operation and the at least one front tether has ½ inch of slack or less during normal operation.

4. The system of claim 1, further comprising a support member configured to be worn on the driver and to position the front, side and rear tethers in relation to the driver, wherein the side tethers are attached underneath the support member.

5. The system of claim 1, further comprising a support member configured to be worn on the driver and to position the tethers in relation to the driver, wherein either two rear tethers are provided having first ends for attachment to the sides or rear of the helmet and to the head and neck restraint device or a single rear tether is provided having an intermediate portion attached to the support member and opposed end portions for attachment to the helmet, wherein the two rear tethers or the opposed end portions of the single rear tether, respectively, angle upwards and forwards from the support member to the helmet during normal operation when the driver is in an upright seated position.

6. The system of claim 1, further comprising a support member configured to be worn on the driver and to position the front, side and rear tethers in relation to the driver, wherein either two rear tethers are provided having first ends for attachment to the sides or rear of the helmet and to the head and neck restraint device or a single rear tether is provided having an intermediate portion attached to the support member and opposed end portions for attachment to the helmet, wherein the two rear tethers or the opposed end portions of the single rear tether, respectively, angle upwards and forwards from the support member to the helmet during normal operation when the driver is in an upright seated position, wherein the angle is in the range of 30 to 40 degrees.

7. The system of claim 1, further comprising a support member configured to be worn on the driver and to position the front, side and rear tethers in relation to the driver, wherein two rear tethers are provided having first ends for attachment to the sides or rear of the helmet and to the head and neck restraint device or a single rear tether is provided having an intermediate portion attached to the support member and opposed end portions for attachment to the helmet, wherein the two rear tethers or the opposed end portions of the single rear tether, respectively, angle inwards from the support member to the helmet during normal operation when the driver is in an upright seated position.

8. The system of claim 1, wherein the side tethers are positioned so as to extend generally vertically downward from the helmet.

9. The system of claim 1, wherein two front tethers are provided having their first ends attachable to the helmet about 1 to 5 inches to the left and right of the helmet's center line.

10. The system of claim 1, wherein either two rear tethers are provided having first ends for attachment to the sides of the helmet and to the head and neck restraint device or a single rear tether is provided having an intermediate portion attached to a support member and opposed end portions for attachment to the helmet, wherein one of the two rear tethers or one of the opposed end portions of the single rear tether, respectively, and one of the side tethers are jointly fixed on the helmet in a single fixing point on each side of the helmet.

11. The system of claim 2 wherein the length of the front and side tethers are adjustable such that the side tethers have ½ inch of slack or less during normal operation and the front tethers have ½ inch of slack or less during normal operation.

12. The system of claim 2, further comprising a support member configured to be worn on the driver and to position the front, rear and side tethers in relation to the driver, wherein the side tethers are attached underneath the support member.

13. The system of claim 2, further comprising a support member configured to be worn on the driver and to position the tethers in relation to the driver, wherein the two rear tethers or the opposed end portions of the single rear tether, respectively, angle upwards and forwards from the support member to the helmet during normal operation when the driver is in an upright seated position.

14. The system of claim 2, further comprising a support member configured to be worn on the driver and to position the tethers in relation to the driver, wherein the two rear tethers or the opposed end portions of the single rear tether, respectively, angle upwards and forwards from the support member to the helmet during normal operation when the driver is in an upright seated position, wherein the angle is in the range of 30 to 40 degrees.

15. The system of claim 2, further comprising a support member configured to be worn on the driver and to position the tethers in relation to the driver, wherein the two rear tethers or the opposed end portions of the single rear tether, respectively, angle inwards from the support member to the helmet during normal operation when the driver is in an upright seated position.

16. The system of claim 2, wherein the side tethers are positioned so as to extend generally vertically downward from the helmet.

17. The system of claim 2, wherein the two front tethers have their first ends attachable to the helmet about 1 to 5 inches to the left and right of the helmet's center line.

18. The system of claim 2, wherein one of the two rear tethers or one of the opposed end portions of the single rear tether, respectively, and one of the side tethers are jointly fixed on the helmet in a single fixing point on each side of the helmet.

19. The system of claim 5, wherein the angle is in the range of 25 to 45 degrees.

20. The system of claim 13, wherein the angle is in the range of 25 to 45 degrees.

* * * * *